United States Patent
Nakacho et al.

(12) 
(10) Patent No.: US 6,596,893 B2
(45) Date of Patent: *Jul. 22, 2003

(54) CROSSLINKED PHENOXYPHOSPHAZENE COMPOUNDS, FLAME RETARDANTS, FLAME-RETARDANT RESIN COMPOSITIONS, AND MOLDINGS OF FLAME-RETARDANT RESINS

(75) Inventors: Yoshifumi Nakacho, Barcelona (ES); Tadao Yabuhara, Tokushima (JP); Yuji Tada, Tokushima (JP); Yoichi Nishioka, Tokushima (JP)

(73) Assignee: Otsuka Chemical Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/331,013

(22) PCT Filed: Jul. 2, 1998

(86) PCT No.: PCT/JP98/02974
§ 371 (c)(1),
(2), (4) Date: Aug. 12, 1999

(87) PCT Pub. No.: WO99/19383
PCT Pub. Date: Apr. 22, 1999

(65) Prior Publication Data
US 2003/0092802 A1 May 15, 2003

(30) Foreign Application Priority Data

Oct. 15, 1997 (JP) ............................................. 9-281679
Feb. 16, 1998 (JP) ............................................. 10-032770

(51) Int. Cl.$^7$ .................................................. C07F 9/02
(52) U.S. Cl. ............................ 558/157; 564/13; 524/86
(58) Field of Search ........................... 524/86; 558/157; 564/13

(56) References Cited

U.S. PATENT DOCUMENTS 4,108,805 A * 8/1978 Dieck et al. ................. 521/180

* cited by examiner

Primary Examiner—Peter D. Mulcahy
(74) Attorney, Agent, or Firm—Sughrue Mion, PLLC

(57) ABSTRACT

This invention has an object of providing a flame retardant which advantageously has a high melting point and a low volatility and is unlikely to depress the inherent properties of resins. The flame retardant of the invention is a phosphazene compound crosslinked with a crosslinking group such as phenylene group, each of the crosslinking groups being interposed between the two oxygen groups left after the elimination of phenyl groups from the phosphazene compound, the amount of the phenyl groups in the crosslinked compound being 50 to 99.9% based on the total number of the phenyl groups in the phosphazene compound. The invention also provides a resin composition containing the flame retardant, and a molded article of the resin.

2 Claims, No Drawings

CROSSLINKED PHENOXYPHOSPHAZENE COMPOUNDS, FLAME RETARDANTS, FLAME-RETARDANT RESIN COMPOSITIONS, AND MOLDINGS OF FLAME-RETARDANT RESINS

FIELD OF THE INVENTION

The present invention relates to crosslinked phenoxyphosphazene compounds, flame retardants, flame-retardant resin compositions and moldings of flame-retardant resins.

BACKGROUND ART

Plastics are used for applications such as electric and electronic products, office automation equipment, office equipment and communications equipment because of their excellent processability, mechanical properties, appearance and the like. The resins used in these applications are required to have flame retardancy for protection against the heat and ignition of internal parts in devices and appliances.

In order to impart flame retardancy to thermoplastic resins or thermosetting resins, a flame retardant is generally added to the resin prior to molding of the resin. Known as flame retardants are inorganic hydroxides, organic phosphorus compounds, organic halogen compounds, halogen-containing organic phosphorus compounds and the like.

Among said flame retardants, those having high flame-retardancy are halogen-containing compounds such as organic halogen compounds, halogen-containing organic phosphorus compounds and the like.

However, these halogen-containing compounds undergo thermal decomposition during molding of the resin to generate hydrogen halide, thereby causing corrosion of the metallic mold and degradation and discoloration of the resin. Another problem is that, when the resin is burned in a fire or the like, hydrogen halide and the like are evolved as gases and smokes detrimental to organisms.

On the other hand, halogen-free flame retardants are magnesium hydroxide, aluminum hydroxide and like inorganic hydroxides and organic phosphorus compounds.

However, the inorganic hydroxides exhibit flame retardancy due to water generated by thermal decomposition, and therefore produce only low flame-retardancy. Consequently, the inorganic hydroxide must be added in a large amount, but such a large amount addition entails a disadvantage that the inherent properties of resins are impaired.

The organic phosphorus compounds are widely used because they give relatively high flame-retardancy. Known as typical organic phosphorus compounds are triphenyl phosphate (TPP), tricresyl phosphate (TCP) and the like. However, these organic phosphorus compounds are liquid or low melting solid and thus have a high volatility, posing problems such as lowering of the molding temperature of resins, blocking and their migration to the surface (juicing) during kneading.

Furthermore, resin compositions containing said organic phosphorus compound have the drawback of dripping (falling of molten resin droplets) during burning and spreading of a fire due to the dripping. Consequently, in order to obtain a rating of V-0 (flaming does not continue for more than a specified period, and there are no molten resin drips which ignite cotton) in a flame retardancy test UL-94 (Testing for Flammability of Plastic Materials for Parts in Devices & Appliances) which is a standard test for evaluating flame retardancy, by adding an organic phosphorus compound to a resin, it is necessary to add a fluorine-containing resin such as polytetrafluoroethylene (PTFE) as an agent for preventing dripping of molten resin during burning. However, the fluorine-containing resin contains halogen and evolves gases harmful to human body during combustion, as stated above.

In view of the foregoing prior art drawbacks, it is desired to develop a novel flame retardant which is free of halogen, which has a high melting point and a low volatility, which would not impair the inherent properties of resins such as mechanical properties and processability, which is free from the problems of inducing blocking and juicing during kneading and which does not permit dripping during flaming.

DISCLOSURE OF THE INVENTION

An object of the present invention is to provide a compound useful as a flame retardant.

Another object of the invention is to provide a halogen-free flame retardant.

A further object of the invention is to provide a flame retardant which has a high melting point and a low volatility and which does not impair the inherent properties of resins, such as mechanical properties and processability.

A still further object of the invention is to provide a flame retardant which does not present the problems of blocking and juicing in kneading.

Another object of the invention is to provide a flame retardant which does not induce dripping during burning.

An additional object of the invention is to provide a flame retardant which is free from the prior art problems.

A still further object of the invention is to provide a flame-retardant resin composition containing the foregoing flame retardant.

Another object of the invention is to provide a molded articles of flame-retardant resin produced by molding said flame-retardant resin composition.

Another object of the invention is to provide a method for imparting flame retardancy to molded articles of resins.

An additional object of the invention is to provide use of a phosphazene compound for imparting flame retardancy to resin molded articles.

Other features of the present invention will become apparent from the following description.

The inventors of the present invention conducted extensive research to overcome the foregoing prior art problems and found that certain partly crosslinked phenoxyphosphazene compounds can be the desired flame retardants. The present invention was completed based on this novel finding.

According to the present invention, there is provided a crosslinked phenoxyphosphazene compound characterized in that at least one phosphazene compound selected from the group consisting of a cyclic phosphazene compound represented by the formula (1)

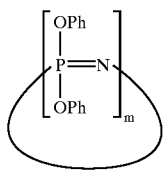

(1)

wherein m is an integer of 3 to 25 and Ph is phenyl group and a straight-chain phosphazene compound represented by the formula (2)

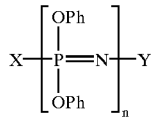

(2)

wherein X represents a group —N=P(OPh)$_3$ or a group —N=P(O)OPh, Y represents a group —P(OPh)$_4$ or a group —P(O)(OPh)$_2$, and n is an integer of 3 to 1000, and Ph is as defined above is crosslinked with at least one crosslinking group selected from the group consisting of o-phenylene group, m-phenylene group, p-phenylene group, biphenylene group, and a group

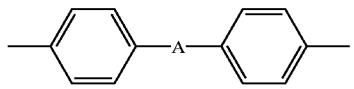

wherein A is —C(CH$_3$)$_2$—, —SO$_2$—, —S— or —O—; wherein each of said crosslinking groups is interposed between the two oxygen atoms left after the elimination of phenyl groups from the phosphazene compound; and wherein the amount of the phenyl groups in the crosslinked compound is 50 to 99.9% based on the total amount of the phenyl groups in said phosphazene compound represented by the formula (1) and/or said phosphazene compound represented by the formula (2).

According to the present invention, there is also provided a flame retardant comprising said crosslinked phenoxyphosphazene compound (this flame retardant will hereinafter be referred to as "flame retardant A").

Flame retardant A comprising the crosslinked phenoxyphosphazene compound of the present invention does not contain halogen, and therefore does not cause the corrosion of the mold and degradation and discoloration of the resin due to the generation of hydrogen halide by thermal decomposition during the resin molding operation, and does not produce gases and smokes detrimental to organisms, such as hydrogen halide, when the resin is burned in a fire or the like. Further, the crosslinked phenoxyphosphazene compound of the present invention has a low volatility and does not lower the molding temperature, and is free from the shortcomings such as blocking or their migration to the surface (juicing) during kneading, and dripping during burning. The incorporation of flame retardant A does not impair inherent properties of resins, such as impact resistance and like mechanical properties, heat resistance, processability and the like.

According to the present invention, there are also provided: (a) a flame-retardant resin composition comprising 100 parts by weight of a thermoplastic resin or a thermosetting resin and 0.1 to 100 parts by weight of flame retardant A; (b) a flame-retardant resin composition comprising 100 parts by weight of a thermoplastic resin or a thermosetting resin, 0.1 to 100 parts by weight of flame retardant A and 0.01 to 50 parts by weight of an inorganic filler; (c) a flame-retardant resin composition comprising 100 parts by weight of a thermoplastic resin or a thermosetting resin, 0.1 to 50 parts by weight of flame retardant A and 0.1 to 50 parts by weight of an organic phosphorus compound free of halogen; and (d) a flame-retardant resin composition comprising 100 parts by weight of a thermoplastic resin, 0.1 to 100 parts by weight of flame retardant A and 0.01 to 2.5 parts by weight of a fluorine-containing resin.

According to the present invention, there are provided flame-retardant resin molded articles produced by molding any of flame-retardant resin compositions (a) to (d).

Furthermore, the inventors of the present invention found that the foregoing contemplated effects of the invention can be achieved likewise when using at least one phosphazene compound selected from the group consisting of the cyclic phosphazene compound represented by the formula (1) and the straight-chain phosphazene compound represented by the formula (2) in combination with an inorganic filler or an organic phosphorus compound free of halogen.

According to the present invention, there is provided a flame retardant comprising at least one phosphazene compound selected from the group consisting of the cyclic phosphazene compound represented by the formula (1) and the straight-chain phosphazene compound represented by the formula (2) (said flame retardant will hereinafter be referred to as "flame retardant B").

According to the present invention, there are also provided: (e) a flame-retardant resin composition comprising 100 parts by weight of a thermoplastic resin or a thermosetting resin, 0.1 to 100 parts by weight of flame retardant B and 0.01 to 50 parts by weight of an inorganic filler; and (f) a flame-retardant resin composition comprising 100 parts by weight of a thermoplastic resin or a thermosetting resin, 0.1 to 50 parts by weight of flame retardant B, and 0.1 to 50 parts by weight of an organic phosphorus compound free of halogen.

According to the present invention, there are provided flame-retardant resin molded articles produced by molding any of flame-retardant resin compositions (e) and (f).

The inventors of the present invention also found that the foregoing contemplated effects of the invention can be achieved when using, as a flame retardant, at least one phosphazene compound selected from the group consisting of a cyclic phosphazene compound represented by the formula (3) and a straight-chain phosphazene compound represented by the formula (4).

According to the present invention, there is provided a flame retardant comprising at least one phosphazene compound selected from the group consisting of a cyclic phosphazene compound represented by the formula (3).

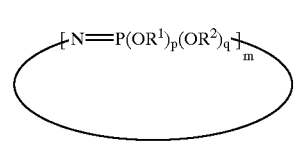

(3)

wherein m is as defined above, $R^1$ is a cyano-substituted phenyl group, $R^2$ represents an alkyl group having 1 to 18 carbon atoms, a group

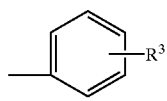

or a group

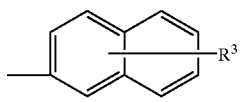

wherein R³ is a hydrogen atom, cyano group, alkyl group having 1 to 10 carbon atoms, allyl group or phenyl group; when two or more R² groups exist, the R² groups may be the same or different; p and q are numbers which fulfil the requirements that p>0, q≧0, and p+q=2, and a straight-chain phosphazene compound represented by the formula (4)

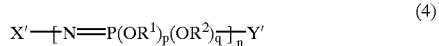
(4)

wherein n, R¹, R², p and q are as defined above, X' represents a group —P(OR¹)₄, a group —P(OR¹)₃(OR²), a group —P(OR¹)₂(OR²)₂, a group —P(OR¹)(OR²)₃, a group —P(OR²)₄, a group —P(O)(OR¹)₂, a group —P(O)(OR¹)(OR²), or a group —P(O)(OR²)₂, and Y' represents a group —N═P(OR¹)₃, a group —N═P(OR¹)₂(OR²), a group —N═P(OR¹)(OR²)₂, a group —N═P(OR²)₃, a group —N═P(O)OR¹ or a group —N═P(O)OR² (this flame retardant will hereinafter be referred to as "flame retardant C").

According to the present invention, there is provided a flame-retardant resin composition comprising 100 parts by weight of a thermoplastic resin or a thermosetting resin and 0.1 to 100 parts by weight of flame retardant C.

According to the present invention, there are provided a flame-retardant resin molded article obtainable by molding said flame-retardant resin composition.

According to the present invention, there is also provided a method for imparting flame retardancy to a resin molded article using flame retardant A, flame retardant B or flame retardant C. For example, by incorporating flame retardant A, flame retardant B or flame retardant C to a resin and molding the mixture, there is provided a resin molded article having a flame retardancy imparted.

According to the present invention, there is provided use of the phosphazene compounds for imparting flame retardancy to a resin.

Crosslinked Phenoxyphosphazene Compounds

The phenoxyphosphazene compounds of the invention can be obtained by, for example, reacting dichlorophosphazene oligomers (a mixture of cyclic dichlorophosphazene oligomers and straight-chain dichlorophosphazene oligomers) with an alkali metal salt of phenol and an alkali metal salt of an aromatic dihydroxy compound. Concerning the dichlorophosphazene oligomers, each of the cyclic and straight-chain dichlorophosphazene oligomers may be isolated from the mixture and used singly. The alkali metal salt of the phenol and the alkali metal salt of the aromatic dihydroxy compound may be mixed together before being subjected to the reaction. Alternatively, the alkali metal salt of phenol and the alkali metal salt of the aromatic dihydroxy compound are consecutively subjected to the reaction in this order or in the reverse order.

The dichlorophosphazene oligomer can be produced by known methods disclosed in, for example, Japanese Unexamined Patent Publication No. 87427/1982 and Japanese Examined Patent Publications Nos. 19604/1983, 1363/1986 and 20124/1987. An exemplary method comprises reacting ammonium chloride and phosphorus pentachloride (or ammonium chloride, phosphorus trichloride and chlorine) at about 120 to 130° C. using chlorobenzene as a solvent, followed by removal of hydrochloric acid.

Examples of the alkali metal salts of phenol include Na salt, K salt and Li salt of phenol. Examples of the alkali metal salts of aromatic dihydroxy compounds include any of the alkali metal salts of known compounds having one or more benzene rings and two hydroxy groups in the molecule. Examples of such alkali metal salts include alkali metal salts of resorcinol, hydroquinone, catechol, 4,4'-isopropylidene diphenol (bisphenol-A), 4,4'-sulfonyldiphenol (bisphenol-S), 4,4'-thiodiphenol, 4,4'-oxydiphenol and 4,4'-diphenol. The alkali metal salts are not limited, but Li salt is preferred. The alkali metal salts of aromatic dihydroxy compounds may be used either singly or in combination.

The alkali metal salt of phenol and the alkali metal salt of the aromatic dihydroxy compound are used in amounts such that the combined amount of the two alkali metal salts, relative to the dichlorophosphazene oligomers, is usually about 1 to 1.5 equivalents (based on the chlorine content of the dichlorophosphazene oligomers), preferably about 1 to 1.2 equivalents (based on the chlorine content of the dichlorophosphazene oligomers). The ratio of the two alkali metal salts (the alkali metal salt of the aromatic dihydroxy compound/the alkali metal salt of phenol, molar ratio) is not paticularly limited and can be suitably selected from a wide range, but is usually about 1/2000 to 1/4. Using the alkali metal salts in the ratio within the above range, the desired crosslinked phenoxyphsphazene compound of the invention can be obtained.

If the ratio is markedly lower than 1/2000, the resulting crosslinked compound has low effect, and it may become difficult to achieve the above objects, such as prevention of dripping of molten resin. On the other hand, if the ratio is much higher than 1/4, the crosslinking proceeds to an excess degree and may result in a crosslinked phenoxyphosphazene compound which is insoluble and infusible and thus has decreased dispersiblility into resins.

The reaction of the dichlorophosphazene oligomers with said two alkali metal salts is carried out at a temperature between room temperature and about 150° C., in a solvent such as an aromatic hydrocarbon (e.g.,toluene) or a halogenated aromatic hydrocarbon (e.g., chlorobenzene).

The terminal groups X and Y in the formula (2) vary in accordance with the reaction conditions and other factors. If the reaction is carried out under ordinary conditions, e.g., under mild conditions in a non-aqueous system, the resulting product will have a structure wherein X is —N═P(OPh)₃ and Y is —P(OPh)₄. If the reaction is carried out under such conditions that moisture or an alkali metal hydroxide is present in the reaction system, or under so severe conditions that a rearrangement reaction occurs, the resulting product will have a structure wherein X is —N═P(OPh)₃ and Y is —P(OPh)₄ and additionally a structure wherein X is —N═P(O)OPh and Y is —P(O)(OPh)₂.

The crosslinked phenoxyphosphazene compound of the invention is thus obtained. The decomposition temperature of the crosslinked phenoxyphosphazene compound of the invention is usually in the range of 250 to 350° C.

In the above process, if the dichlorophosphazene oligomers are reacted only with the alkali metal salt of phenol and is not reacted with the alkali metal salt of the aromatic dihydroxy compound, a cyclic phosphazene compound of the formula (1) or a straight-chain phosphazene compound of the formula (2) is produced. On the other hand, when the alkali metal salt of the aromatic dihydroxy compound is used in addition to the alkali metal salt of phenol, there is provided the crosslinked phenoxyphosphazene compound of the invention, wherein part of the phenyl groups in the cyclic phosphazene compound of the formula (1) and/or the straight-chain phosphazene compound of the formula (2) are substituted by the crosslinking groups.

The proportion of the phenyl groups of the crosslinked phenoxyphosphzene compound of the invention is 50 to 99.9%, preferably 70 to 90%, based on the total amount of the phenyl groups in the phosphazene compound of the formula (1) and/or phosphazene compound of the formula (2).

The crosslinked phenoxyphosphazene compound of the invention is isolated and purified from the reaction mixture by a conventional isolation method such as washing, filtration, drying or the like.

Flame Retardant (a) Flame retardant A

Flame retardant A comprises the crosslinked phenoxyphosphazene compound of the present invention.

(b) Flame retardant B

Flame retardant B will be described below.

The cyclic phosphazene compounds of the formula (1) and the straight-chain phosphazene compounds of the formula (2) are known compounds. These phosphazene compounds are disclosed in, for example, James E. Mark, Harry R. Allcock, Robert West, "Inorganic Polymers" Pretice-Hall International, Inc., 1992, pp. 61–140.

The cyclic phosphazene compound of the formula (1) and the straight-chain phosphazene compound of the formula (2) can be produced by, for example, following the above process for producing the crosslinked phenoxyphosphazene compound except that the alkali metal salt of the aromatic dihydroxy compound is not used.

The obtained phosphazene compound is isolated and purified from the reaction mixture by a conventional isolation method such as washing, filtration, drying or the like.

Specific examples of the cyclic phosphazene compounds of the formula (1) include phosphazene compounds in which phenoxy groups are substituted in a mixture of cyclic and straight-chain chlorophosphazenes wherein n is an integer of 3 to 25, e.g., hexachlorocyclotriphosphazene, octachlorocyclotetraphosphazene and the like, prepared by reacting ammonium chloride and phosphorus pentachloride at 120 to 130° C.; and hexaphenoxycyclotriphosphazene, octaphenoxycyclotetraphosphazene and decaphenoxycyclopentaphosphazene and like cyclic phosphazene compounds obtained by isolating, from the above mixture of chlorophosphazenes, hexachlorocyclotriphosphazene, octachlorocyclotetraphosphazene, decachlorocyclopentaphosphazene or the like, and substituting the isolated product by phenoxy groups.

Specific examples of the straight-chain phosphazene compounds of the formula (2) include those obtained by heating hexachlorocyclotriphosphazene to 220 to 250° C. for ring-opening polymerization and substituting, by phenoxy groups, the resulting dichlorophosphazene wherein n is an integer of 3 to 1000.

Among these examples, phosphazene compounds obtained by substituting, by phenoxy groups, a mixture of cyclic or straight-chain chlorophosphazenes wherein n is an integer of 3 to 25.

(c) Flame retardant C

Flame retardant C will be described below.

As the phosphazene compound of the formula (3), preferred are, for example, cyclic phosphazene compounds wherein $R^1$ is a cyano-substituted phenyl group, $R^2$ is an alkyl group having 1 to 8 carbon atoms, a group

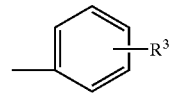

or a group

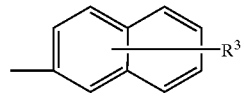

and $R^3$ is a hydrogen atom, alkyl group having 1 to 4 carbon atoms or allyl group, p is 0.3 to 1.7, and q is 0.3 to 0.7.

As the phosphazene compounds represented by the formula (4), preferred are, for example, straight-chain phosphazene compounds wherein $R^1$ is a cyano-substituted phenyl group, $R^2$ is an alkyl group having 1 to 8 carbon atoms, a group

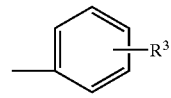

or a group

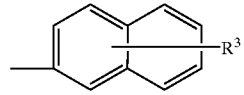

$R^3$ is a hydrogen atom, alkyl group having 1 to 4 carbon atoms or allyl group, p is 0.3 to 1.7, and q is 0.3 to 0.7.

The cyano-substituted phenyl group represented by $R^1$ is, for example, 2-cyanophenyl, 3-cyanophenyl or 4-cyanophenyl group, and so on.

More specifically, the phosphazene compounds represented by the formulas (3) and (4) include cyclic phosphazene compounds or straight-chain phosphazene compounds, such as cyclotriphosphazene, cyclotetraphosphazene and cyclopentaphosphazene, each substituted by both cyanophenoxy and phenoxy groups.

Specific examples of cyclic phosphazene compounds substituted by both cyanophenoxy and phenoxy groups include monocyanophenoxypentaphenoxycyclotriphosphazene, dicyanophenoxytetraphenoxycyclotriphosphazene, tricyanophenoxytriphenoxycyclotriphosphazene, tetracyanophenoxydiphenoxycyclotriphosphazene, pentacyanophenoxymonophenoxycyclotriphosphazene and like cyclotriphosphazene compounds; monocyanophenoxyheptaphenoxycyclotetraphosphazene, dicyanophenoxyhexaphenoxycyclotetraphosphazene, tricyanophenoxypentaphenoxycyclotetraphosphazene, tetracyanophenoxytetraphenoxycyclotetraphosphazene, pentacyanophenoxytriphenoxycyclotetraphosphazene, hexacyanophenoxydiphenoxycyclotetraphosphazene, heptacyanophenoxymonophenoxycyclotetraphosphazene and like cyclotetraphosphazene compounds; and cyclopentaphosphazene compounds substituted by both cyanophenoxy and phenoxy groups.

Examples of the straight-chain phosphazene compounds include those substituted by both cyanophenoxy and phenoxy groups.

These phosphazene compounds may be used singly or in combination.

Among the above phosphazene compounds, phosphazene oligomers (mixtures of cyclic and straight-chain phosphazene oligomers) substituted by both cyanophenoxy and phenoxy groups are preferred in view of their production processes and availability. Particularly preferred are phosphazene oligomers wherein the ratio of cyanophenoxy group content to the phenoxy group content is 1:7 to 7:1.

The cyanophenoxy group-containing phosphazene compound (a phosphazene compound represented by the formula (3) or (4)) of the present invention can be produced by various processes.

Usable starting materials for the production of the cyanophenoxy group-containing phosphazene compound include hexachlorocyclotriphosphazene, octachlorocyclotetraphosphazene and like cyclic or straight-chain phosphazene compounds obtained by, for example, reacting ammonium chloride and phosphorus pentachloride at 120 to 130° C., as illustrated by the following Reaction Scheme-1. Solvents usable in this reaction include tetrachloroethane, chlorobenzene and the like.

Reaction Scheme-1

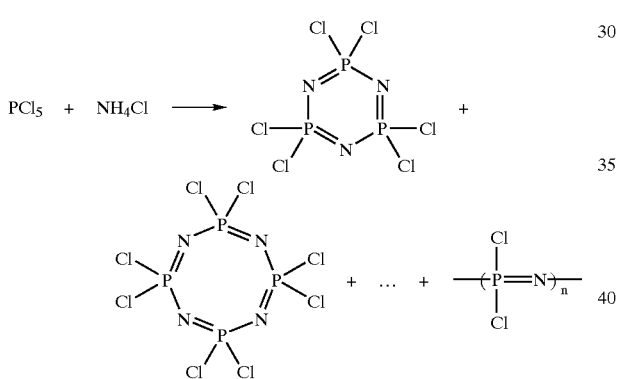

wherein n is as defined above.

Also usable as starting materials are straight-chain dichlorophosphazenes obtained by isolating hexachlorocyclotriphosphazene from the mixture of cyclic and straight-chain phosphazene compounds prepared by the process shown by Reaction Scheme-1, heating the hexachlorocyclotriphosphazene at 220 to 250° C. for ring-opening polymerization (see Reaction Scheme-2).

Reaction Scheme -2

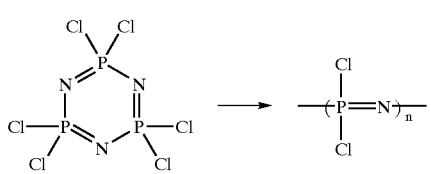

wherein n is as defined above.

The cyanophenoxy group-containing phosphazene compound of the invention can be produced by, for example, a process comprising reacting the cyclic or straight-chain phosphazene compound obtained above, with a mixture consisting of, in a desired ratio, an alkali metal salt of a cyanophenol and an alkali metal salt of at least one member selected from the group consisting of phenols (including phenols substituted on the aromatic ring by an alkyl group having 1 to 10 carbon atoms, allyl group or phenyl group), naphthols (including naphthols substituted on the aromatic ring by an alkyl group having 1 to 10 carbon atoms, allyl group or phenyl group) and alcohols having 1 to 18 carbon atoms (these will hereinafter be referred to as "phenolic compound").

For example, a mixture of a cyanophenol, a phenolic compound and sodium hydroxide in a desired ratio is subjected to dehydration reaction to prepare sodium salt of the cyanophenol and sodium salt of the phenolic compound. This dehydration reaction is performed merely for removing water, and can be carried out with or without use of a solvent. The solvent, when used, may be benzene, toluene, xylene, chlorobenzene or the like. Azeotropic distillation using such a solvent may increase the dehydration efficiency in some cases. Subsequently, the cyclic or straight-chain phosphazene compound obtained above is added to the mixture of sodium salt of the cyanophenol and sodium salt of the phenolic compound, and the resulting mixture is subjected to substitution reaction by heating at 50 to 150° C. for 1 to 24 hours, giving the desired cyanophenoxy group-containing phosphazene compound.

Reaction Scheme-3

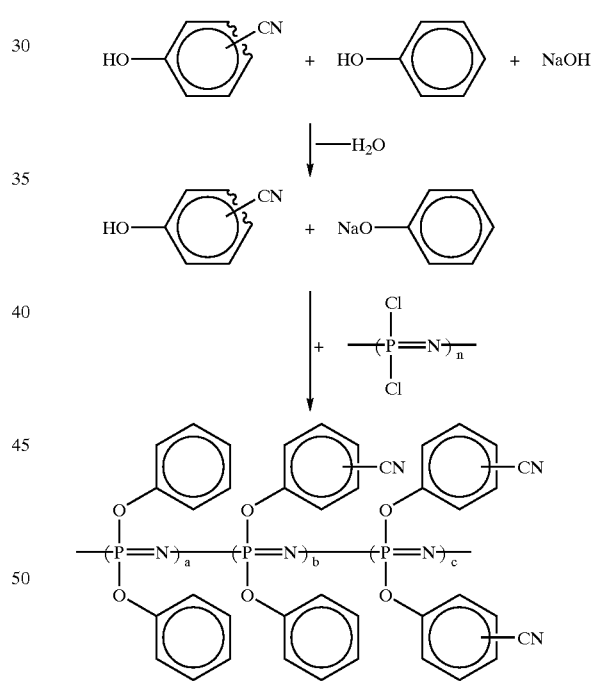

wherein n is as defined above, and n=a+b+c.

The desired cyanophenoxy group-containing phosphazene compound can be obtained by dehydration reaction and substitution reaction, as described above. From the viewpoint of efficiency of these reactions, chlorobenzene is selected as the solvent. When chlorobenzene is used as the solvent, the substitution reaction is completed by performing the reaction at the reflux temperature of chlorobenzene for about 12 hours.

Other production processes can be also employed which include a process comprising reacting an isolated and purified cyclic or straight-chain dichlorophosphazene with the alkali metal salt of a cyanophenol and the alkali metal salt of the phenolic compound; or a process comprising reacting the dichlorophosphazene oligomer consecutively with the alkali metal salt of a cyanophenol and the alkali metal salt of the phenolic compound.

The cyanophenoxy-containing phosphazene compound obtained above is isolated and purified from the reaction mixture by a conventional isolation method such as washing, filtration, drying or the like.

Flame-retardant Resin Composition

The flame-retardant resin composition of the present invention comprises a thermoplastic resin or a thermosetting resin, and flame retardant A, B or C. Hereinafter, the term "flame-retardant resin composition of the present invention" collectively refers to the resin compositions containing a thermoplastic resin or a thermosetting resin as a matrix, unless otherwise indicated.

(a) Thermoplastic Resin

A wide variety of resins known in the art may be used as the thermoplastic resin for use in the present invention. Such resins are, for example, polyethylene, polypropylene, polyisoprene, polyesters (polyethylene terephthalate, polybutylene terephthalate, etc.), polybutadiene, styrene resin, impact-resistant polystyrene, acrylonitrile-styrene resin (AS resin), acrylonitrile-butadiene-styrene resin (ABS resin), methyl methacrylate-butadiene-styrene resin (MBS resin), methyl methacrylate-acrylonitrile-butadiene-styrene resin (MABS resin), acrylonitrile-acrylic rubber-styrene resin (AAS resin), polymethyl (meth)acrylate, polycarbonate, modified polyphenylene ether (PPE), polyamide, polyphenylene sulfide, polyimide, polyether ether ketone, polysulfone, polyarylate, polyether ketone, polyether nitrile, polythioether sulfone, polyether sulfone, polybenzimidazol, polycarbodiimide, polyamideimide, polyetherimide, liquid crystalline polymer, composite plastics and the like.

Among these thermoplastic resins, polyester, ABS resin, polycarbonate, modified polyphenylene ether, polyamide, etc., are preferably used.

In the present invention, the thermoplastic resins may be used singly or in combination.

(b) Thermosetting Resin

A wide variety of resins known in the art may be used as the thermosetting resin for use in the present invention. Such thermosetting resins include polyurethane, phenol resin, melamine resin, urea resin, unsaturated polyester resin, diallyl phthalate resin, silicon resin and epoxy resin.

Among these thermosetting resins, particularly preferable are polyurethane, phenolic resin, melamine resin, epoxy resin, etc.

The epoxy resins are not limited to any specific types and may be selected from a wide variety of epoxy resins known in the art. Examples of such epoxy resins include bisphenol-A type epoxy resin, bisphenol-F type epoxy resin, bisphenol-AD type epoxy resin, phenol novolac type epoxy resin, cresol novolac type epoxy resin, cycloaliphatic epoxy resin, glycidyl ester-based resin, glycidyl amine-based epoxy resin, heterocyclic epoxy resin, urethane modified epoxy resin and brominated bisphenol-A type epoxy resin.

In the present invention, the thermosetting resins may be used singly or in combination.

The amount of the flame retardant A, flame retardant B or flame retardant C relative to the thermoplastic resin or thermosetting resin is not particularly limited, but is 0.1–100 wt. parts, preferably 1–50 wt. parts, more preferably 5–30 wt. parts, based on 100 wt. parts of the thermoplastic resin or thermosetting resin.

(c) Inorganic Filler

The flame-retardant resin composition of the present invention may contain inorganic fillers to further enhance dripping preventing effect.

Conventionally, these inorganic fillers have been used mainly as reinforcements for improving the mechanical properties of resins. However, the inventors of the present invention have found that said flame retardants and inorganic fillers, when both were present in a resin, act synergistically and therefore are effective for improving the flame-retardant effects of the flame retardant, especially dripping preventive effect, as well as the mechanical properties of the resin.

When said flame retardant and the inorganic filler are both present in a resin, the surface layer of the resin becomes dense and reinforced. This prevents the diffusion of gases formed during combustion, and induces the formation of a char layer from the flame retardant, resulting in high flame-retardancy. In particular, it is essential to use the flame retardant B in combination with inorganic fillers.

The inorganic fillers may be known fillers for resins. Examples of such fillers include mica, kaolin, talc, silica, clay, barium sulfate, barium carbonate, calcium carbonate, calcium sulfate, calcium silicate, titanium oxide, glass beads, glass balloons, glass flakes, glass fibers, fibrous alkali metal titanates (potassium titanate fibers, etc.), fibrous transition metal borates (aluminum borate fibers, etc.), fibrous alkaline earth metal borates (magnesium borate fibers, etc.), zinc oxide whisker, titanium oxide whisker, magnesium oxide whisker, gypsum whisker, aluminum silicate (mineralogical name: mullite) whisker, calcium silicate (mineralogical name: wollastonite) whisker, silicon carbide whisker, titanium carbide whisker, silicon nitride whisker, titanium nitride whisker, carbon fibers, alumina fibers, alumina-silica fibers, zirconia fibers, quartz fibers and the like.

Among these inorganic fillers, it is preferred to use fillers having shape anisotropy such as fibrous fillers, e.g., fibrous alkali metal titanates, fibrous transition metal borates, fibrous alkaline earth metal borates, zinc oxide whisker, titanium oxide whisker, magnesium oxide whisker, aluminum silicate whisker, calcium silicate whisker, silicon carbide whisker, titanium carbide whisker, silicon nitride whisker, titanium nitride whisker, and mica. More preferable are fibrous alkali metal titanates, fibrous transition metal borates, fibrous alkaline earth metal borates, titanium oxide whisker, calcium silicate whisker and the like.

These inorganic fillers may be used singly or in combination.

Among these inorganic fillers, those having shape anisotropy such as whiskers and mica are preferably used.

Examples of the potassium titanate fibers among inorganic fillers include potassium hexatitanate fibers having an average fiber diameter of about 0.05–2 $\mu$m and an average fiber length of about 1–500 $\mu$m, and preferably having an aspect ratio (fiber length/fiber diameter) of 10 or greater. Among them, potassium hexatitanate fibers having a pH ranging from 6 to 8.5 are more preferable. A pH of potassium titanate fibers mentioned herein refers to a pH, as determined at 20° C., of 1.0 wt. % of an aqueous suspension of potassium titanate fibers (in deionized water) which was stirred for 10 minutes. If the pH of the potassium titanate fibers is much higher than 8.5, physical properties of the resin and resistance to discoloration with heat may be disadvantageously decreased. On the other hand, when the pH is far below 6, the strength of the resulting resin composition is not effectively increased, and the residual acid may corrode processing machines and metallic molds. Hence it is not favorable.

The amount of the inorganic filler relative to the thermoplastic resin or thermosetting resin is not particularly limited. In view of a balance of improvements in mechanical properties and flame retardancy, however, the amount is 0.01–50 wt. parts, preferably 1–20 wt. parts, based on 100 wt. parts of the thermoplastic resin or thermosetting resin.

(d) Organic Phosphorus Compound Free of Halogen

The flame-retardant resin composition of the present invention may contain an organic phosphorus compound free of halogen (hereinafter referred to as "halogen-free organic phosphorus compounds") to further improve the flame retardancy thereof.

It is known that halogen-free organic phosphorus compounds are capable of improving the flame retardancy of the matrix such as resins. However, the inventors of the present invention found that when the specific phosphazene compounds for use in the present invention is used in combination with the halogen-free organic phosphorus compound, the flame-retardant effect is significantly increased due to synergism. The reason for this remarkable effect still remains to be elucidated. However, it is presumably because the conjoint use of these two compounds serves to form an expansion layer along with a char layer on the surface of the resin composition during combustion, and these layers suppress the diffusion of decomposition products and heat transfer.

A wide variety of halogen-free organic phosphorus compounds known in the art may be used in the present invention. For example, useful compounds include those disclosed in Japanese Examined Patent Publication No. 19003/1994, Japanese Unexamined Patent Publication No. 115262/1990, Japanese Unexamined Patent Publication No. 1079/1993, Japanese Unexamined Patent Publication No. 322277/1994, the specification of U.S. Pat. No. 5,122,556, etc.

Specific examples of the halogen-free phosphorus compound include trimethyl phosphate, triethyl phosphate, tributyl phosphate, trioctyl phosphate, triphenyl phosphate, tricresyl phosphate, trixylyl phosphate, cresyl diphenyl phosphate, xylyl diphenyl phosphate, tolyl dixylyl phosphate, tris(nonylphenyl) phosphate, (2-ethylhexyl) diphenyl phosphate and like phosphates; resorcinol diphenyl phosphate, hydroquinone diphenyl phosphate and like hydroxyl-containing phosphates; resorcinol bis(diphenyl phosphate), hydroquinone bis(diphenyl phosphate), bisphenol-A bis(diphenyl phosphate), bisphenol-S bis(diphenyl phosphate), resorcinol bis(dixylyl phosphate), hydroquinone bis(dixylyl phosphate), bisphenol-A bis(ditolyl phosphate), biphenol-A bis(dixylyl phosphate), bisphenol-S bis(dixylyl phosphate) and like condensed phosphate compounds; and trilauryl phosphine, triphenyl phosphine, tritolyl phosphine, triphenyl phosphine oxide, tritolyl phosphine oxide and like phosphines or phosphine oxide compounds.

Among these halogen-free organic phosphorus compounds, preferable are triphenyl phosphate, tricresyl phosphate, trixylyl phosphate, resorcinol bis(diphenyl phosphate), hydroquinone bis(diphenyl phosphate), bisphenol-A bis(diphenyl phosphate), resorcinol bis(dixylyl phosphate), hydroquinone bis(dixylyl phosphate), bisphenol-A bis(ditolyl phosphate) and like condensed phosphate compounds; and triphenyl phosphine oxide, tritolyl phosphine oxide and like phosphine oxide compounds. In particular, preferable are the compounds such as triphenyl phosphate, resorcinol bis(diphenyl phosphate), resorcinol bis(dixylyl phosphate), triphenyl phosphine oxide and the like.

These halogen-free organic phosphorus compounds may be used singly or in combination.

These halogen-free organic phosphorus compounds are more effective when used in combination with flame retardant A or flame retardant B.

The amount of the halogen-free organic phosphorus compound relative to the thermoplastic resin or thermosetting resin is not particularly limited. In view of a balance of improvements in mechanical properties and flame retardancy, however, the amount of the halogen-free organic phosphorus compound is 0.1–50 wt. parts, preferably 1–30 wt. parts, based on 100 wt. parts of the thermoplastic resin or thermosetting resin. The amount of the flame retardant to be added thereto is 0.1–50 wt. parts, preferably 5–30 wt. parts, based on 100 wt. parts of the thermoplastic resin or thermosetting resin.

(e) Fluorine-containing Resin

Further, a fluorine-containing resin may be incorporated into the flame-retardant resin composition of the present invention containing a thermoplastic resin as a matrix within the range which does not adversely affect the object of the present invention. The amount of the fluorine-containing resin to be used is not particularly limited, but is 0.01–2.5 wt. parts, preferably 0.1–1.2 wt. parts, based on 100 wt. parts of the thermoplastic resins.

A wide variety of fluorine-containing resins known in the art may be used in the present invention. The examples include polytetrafluoroethylene resin (PTFE), tetrafluoroethylene-hexafluoropropylene copolymer resin (FEP), tetrafluoroethylene-perfluoroalkyl vinyl ether copolymer resin (PFA), tetrafluoroethylene-ethylene copolymer resin (ETFE), polychlorotrifluoroethylene resin (CTFE) and polyvinylidene fluoride (PVdF). Among these, PTFE is particularly preferable. By the addition of the fluorine-containing resins, the dripping preventing effect is produced in a more pronounced manner.

Fluorine-containing resins are more effective when used in combination with flame retardant A.

(f) Other Additives

The flame-retardant composition of the invention is a resin composition which does not contain a halogen (e.g., chlorine, bromine)-containing compound as a flame retardant component but can produce excellent flame retardant effects. One or more flame retardant additives conventionally used may be incorporated into the composition insofar as they do not adversely affect the excellent effects.

The flame retardant additive for use is not limited, and usually any additive that produces flame retardant effects can be used. Examples of useful flame retardant additives are metal oxides such as zinc oxide, tin oxide, iron oxide, molybdenum oxide, copper oxide and manganese dioxide; metal hydroxides such as aluminum hydroxide, magnesium hydroxide, zirconium hydroxide, oxalic acid-treated aluminum hydroxide and nickel compound-treated magnesium hydroxide; alkali metal salts or alkaline earth metal salts such as sodium carbonate, calcium carbonate, barium carbonate and sodium alkylsulfonate; organic chlorine compounds or organic bromine compounds such as chlorinated paraffin, perchlorocyclopentadecane, tetrabromobisphenol-A; epoxy resins, bis(tribromophenoxy)ethane and bis(tetrabromophthalimino)ethane; antimony compounds such as antimony trioxide, antimony tetraoxide, antimony pentaoxide and sodium antimonate; red phosphorus, halogen-containing phosphoric ester compounds, halogen-containing condensed phosphoric ester compounds or phosphonic acid ester compounds, nitrogen-containing compounds such as melamine, melamine cyanurate, melamine phosphate, melam, melem, mellon, succinoguanamine, guanidine sulfamate, ammoninum sulfate, ammonium phosphate, ammonium polyphosphate and alkylamine phosphate; boron compounds such as zinc borate, barium methaborate and ammonium borate; silicon compounds such as silicone polymers and silica; and thermally expansive graphite.

These flame retardant additives can be used singly or in combination.

Incorporating a trace amount of a Lewis acid into flame-retardant resin compositions containing flame retardant C of the invention imparts further improved heat resistance and flame retardancy to the resin. Useful Lewis acids include a wide variety of those known, for example, zinc chloride, ferric chloride and the like. These Lewis acids can be used singly or in combination, and the amount of the Lewis acid to be incorporated is usually about 0.01 to about 0.6 wt. parts, based on the total weight of the flame-retardant resin composition.

Further, one or more conventional resin additives may be incorporated into the flame-retardant composition of the invention, insofar as they do not adversely affect the excellent properties. Examples of useful resin additives include flame retardants other than the aforementioned ones, dripping inhibitors (dropping inhibitors), UV absorbers, light stabilizers, antioxidants, light screens, metal deactivators, quenching agents, heat resistance stabilizers, lubricants, mold releasing agents, coloring agents, antistatic agents, antiaging agents, plasticizers, impact strength improving agents and compatibilizers.

The UV absorber is a component for absorbing light energy and releasing the absorbed light energy harmlessly in the form of heat energy by the transformation thereof into a keto form through intramolecular proton transfer (in the case of benzophenones and benzotriazoles) or by cis-trans isomerization (in the case of cyanoacrylates). Specific examples of UV absorbers include 2-hydroxybenzophenones such as 2,4-dihydroxybenzophenone, 2-hydroxy-4-methoxybenzophenone, 2-hydroxy-4-octoxybenzophenone and 5,5'-methylenebis(2-hydroxy-4-methoxybenzophenone); 2-(2'-hydroxyphenyl) benzotriazoles such as 2-(2'-hydroxy-5'-methylphenyl) benzotriazole, 2-(2'-hydroxy-5'-t-octylphenyl)benzotriazole, 2-(2'-hydroxy-3',5'-di-t-butylphenyl)benzotriazole, 2-(2'-hydroxy-3',5'-di-t-butylphenyl)-5-chlorobenzotriazole, 2-(2'-hydroxy-3'-t-5'-methylphenyl)-5-chlorobenzotriazole, 2-(2'-hydroxy-3',5'-dicumylphenyl)benzotriazole and 2,2'-(methylenebis(4-t-octyl-6-benzotriazolyl)phenol; benzoates such as phenylsalicylate, resorcinol monobenzoate, 2,4-di-t-butylphenyl-3',5'-di-t-butyl-4'-hydroxybenzoate and hexadecyl-3,5-di-t-butyl-4-hydroxybenzoate; and substituted oxalic anilide such as 2-ethyl-2'-ethoxy oxalic anilide and 2-ethoxy-4'-dodecyl oxalic anilide; cyanoacrylates such as ethyl-α-cyano-β,β-diphenylacrylate and methyl-2-cyano-3-methyl-3-(p-methoxyphenyl)acrylate.

The light stabilizer is a component for decomposing hydroperoxides produced by light energy into stable N-O.radical, N—OR or N—OH, thereby providing light stability. For example, hindered amine light stabilizers can be used. Specific examples of light stabilizers include 2,2,6,6-tetramethyl-4-piperidyl-stearate, 1,2,2,6,6-pentamethyl-4-piperidylstearate, 2,2,6,6-tetramethyl-4-piperidylbenzoate, bis(2,2,6,6-tetramethyl-4-piperidylsebacate, bis(1,2,2,6,6-pentamethyl-4-piperidyl)-sebacate, tetrakis(2,2,6,6-tetramethyl-4-piperidyl)-1,2,3,4-butane tetracarboxylate, tetrakis(1,2,2,6,6-pentamethyl-4-piperidyl)-1,2,3,4-butanetetracarboxylate, bis(1,2,2,6,6-pentamethyl-4-piperidyl)-di(tridecyl)-1,2,3,4-butanetetracarboxylate, bis(1,2,2,6,6-pentamethyl-4-piperidyl)-2-butyl-2-(3',5'-di-t-butyl-4-hydroxybenzyl)malonate, 1-(2-hydroxyethyl)-2,2,6,6-tetramethyl-piperidinol/diethyl succinate polycondensate, 1,6-bis(2,2,6,6-tetramethyl-4-piperidylamino)hexane/dibromoethane polycondensate, 1,6-bis(2,2,6,6-tetramethyl-4-piperidylamino)hexane/2,4-dichloro-6-t-octylamino-s-triazine polycondensate, 1,6-bis(2,2,6,6-tetramethyl-4-piperidylamino)hexane/2,4-dichloro-6-morpholino-s-triazine polycondensate, and the like.

The antioxidant is a component for stabilizing peroxide radicals, such as hydroperoxy radicals, which are formed upon heat with molding or light exposure, or for decomposing generated peroxides, such as hydroperoxides. Examples of antioxidants include hindered phenol type antioxidants and peroxide decomposers. The hindered phenol type antioxidant acts as a radical chain-transfer inhibitor, and the peroxide decomposer decomposes peroxides generated in the reaction system into a stable alcohol, and prevents autoxidation.

Specific examples of hindered phenol type antioxidants include 2,6-di-t-butyl-4-methylphenol, styrenated phenol, n-octadecyl-3-(3,5-di-t-butyl-4-hydroxylphenyl)propionate, 2,2'-methylene bis(4-methyl-6-t-butylphenol), 2-t-butyl-6-(3-t-butyl-2-hydroxy-5-methylbenzyl)-4-methylphenylacrylate, 2-[1-(2-hydroxy-3,5-di-t-pentylphenyl)ethyl]-4,6-di-t-pentylphenylacrylate, 4,4'-butylidene bis(3-methyl-6-t-butylphenol), 4,4'-thiobis(3-methyl-6-t-butylphenol), alkylated bisphenol, tetrakis [methylene-3-(3,5-di-t-butyl-4-hydroxyphenyl)proprionate] methane, 3,9-bis[2-{3-(3-t-butyl-4-hydroxy-5-methylphenyl)propionyloxy}-1,1-dimethylethyl]-2,4,8,10-tetraoxaspiro[5.5]undecane, and the like.

Examples of peroxide decomposers include organic phosphorus type peroxide decomposers such as tris(nonylphenyl) phosphite, triphenyl phosphate and tris(2,4-di-t-butylphenyl)phosphite; and organic thio type peroxide decomposers such as dilauryl-3,3'-thiodipropionate, dimyristyl-3,3'-thiodipropionate, distearyl-3,3'-thiodipropionate, pentaerythrityltetrakis(3-laurylthiopropionate), ditridecyl-3,3'-thiodipropionate and 2-mercaptobenzimidazole.

The light screen is a component for preventing light from penetrating into the bulk of a polymer. Specific examples of light screens include titanium oxide having a rutile structure ($TiO_2$), zinc oxide (ZnO), chromium oxide ($Cr_2O_3$) and cerium oxide ($CeO_2$).

The metal deactivator is a component for deactivating heavy metal ions in the resin by forming a chelate compound. Specific examples of metal deactivators include benzotriazoles and derivatives thereof (e.g. 1-hydroxybenzotriazole and the like).

The quenching agent is a component for deactivating photo-excited hydroperoxides and functional groups such as carbonyl groups in the polymer due to energy transfer. Useful quenching agents include organic nickel and the like.

In order to impart improved antifogging, antifungal, antimicrobial or like properties, other conventionally known additives may also be added.

Production of Flame-Retardant Resin Compositions of the Invention

The flame-retardant resin composition of the invention can be produced by mixing a thermoplastic resin or a thermosetting resin and the aforementioned frame retardant, optionally toghether with an inorganic filler, a halogen-free organic phosphorus compound, a fluorine-containing resin, one or more flame retardant additives and other additives, in prescribed or proper amounts, followed by mixing and kneading the mixture by a conventional method. For example, the mixture of components in the form of powder, beads, flakes or pellets is kneaded using an extruder, e.g., a uniaxial extruder or a biaxial extruder, or a kneader, e.g., Banbury mixer, a pressure kneader or a two-roll mill, giving a resin composition of the invention. When a liquid needs to be added, a conventional liquid injection device can be used and the mixture can be kneaded using the aforementioned extruder, kneader or the like.

Flame-Retardant Resin Moldings of the Invention

The flame-retardant resin composition of the invention can be molded into flame-retardant resin moldings. For example, the resin composition can be molded into resin plates, sheets, films, special shapes or like extrusion moldings of various shapes using a conventional molding method such as press molding, injection molding or extrusion molding, or can be molded into a resin plate of two- or three-layered structure using a coextruder.

The thus-obtained flame-retardant resin composition and flame-retardant resin moldings of the invention can find wide application in various industrial fields, such as electrical, electronics or telecommunication industries, agriculture, forestry, fishery, mining, construction, foods, fibers, clothing, medical services, coal, petroleum, rubber, leather, automobiles, precision machinery, timber, furniture, printing, musical instruments, and the like.

Stated more specifically, the flame-retardant resin composition and flame-retardant resin moldings of the invention can be used for business or office automation equipment, such as printers, personal computers, word processors, keyboards, PDA (personal digital assistants), telephones, facsimile machines, copying machines, ECR (electronic cash registers), desk-top electronic calculators, electronic databooks, electronic dictinaries, cards, holders and stationery; electrical household appliances and electrical equipment such as washing machines, refrigerators, cleaners, microwave ovens, lighting equipment, game machines, irons and kotatsu (low, covered table with a heat source underneath); audio-visual equipment such as TV, VTR, video cameras, radio cassette recorders, tape recorders, mini discs, CD players, speakers and liquid crystal displays; and electric or electronic parts and telecommunication equipment, such as connectors, relays, condensers, switches, printed circuit boards, coil bobbins, semiconductor sealing materials, electric wires, cables, transformers, deflecting yokes, distribution boards, and clocks and watches.

Further, the flame-retardant resin composition and flame-retardant resin moldings can be widely used for the following applications: materials for automobiles, vehicles, ships, aircrafts and constructions, such as seats (e.g., padding, outer materials), belts, ceiling covering, convertible tops, arm rests, door trims, rear package trays, carpets, mats, sun visors, wheel covers, mattress covers, air bags, insulation materials, hangers, hand straps, electric wire coating materials, electrical insulating materials, paints, coating materials, overlaying materials, floor materials, corner walls, deck panels, covers, plywoods, ceiling boards, partition plates, side walls, carpets, wall papers, wall covering materials, exterior decorating materials, interior decorating materials, roofing materials, sound insulating panels, thermal insulation panels and window materials; and living necessities and sporting goods such as clothing, curtains, sheets, plywoods, laminated fiber boards, carpets, entrance mats, seats, buckets, hoses, containers, glasses, bags, cases, goggles, skies, rackets, tents and musical instruments.

BEST MODE FOR CARRYING OUT THE INVENTION

The present invention will be specifically described below with reference to Synthesis examples, Examples and Comparative Examples. In the following description, parts and % mean weight parts and weight %, respectively, unless otherwise specified. In addition, Ph— means phenyl group and —Ph— means phenylene group.

SYNTHESIS EXAMPLE 1

(Synthesis of Compound A; phenoxyphosphazene compound having paraphenylene-crosslinked structure)

Phenol (2.04 moles, 196 g) and 2.04 moles (82 g) of sodium hydroxide were subjected to azeotropic dehydration with use of toluene to prepare about 1200 g of a 20% solution of sodium phenolate in toluene.

In parallel with the above reaction, 580 g of a 20% solution containing 115.9 g of dichlorophosphazene oligomers (a mixture of 58.57% of trimer, 12.26% of tetramer, 11.11% of pentamer and hexamer, 2.82% of heptamer, 12.04% of octamer and higher oligomers) in chlorobenzene was placed in a 4-necked, 2-liter flask, and a 10% solution containing 0.15 mole (18.3 g) of separately prepared hydroquinone dilithium salt in toluene was added dropwise thereto with stirring. After the dropwise addition, the mixture was subjected to a reaction with stirring at 50° C. for 5 hours. Subsequently, about 1200 g of the previously prepared 20% solution of sodium phenolate in toluene was added dropwise thereto, and the resulting mixture was subjected to a reaction with stirring at 100° C. for 8 hours.

After the reaction was completed, the reaction mixture was concentrated and poured into 3 liters of a mixture of water/methanol (1/1 by volume) with stirring, and the mixture was neutralized with dilute sulfuric acid and filtered. The obtained product was washed twice with 3 liters of a mixture of water/methanol (1/1 by volume), separated by filtration, and dried in a vacuum with heating at 80° C. at a pressure of 20 mmHg for 11 hours to give 220 g of a pale yellow powder.

The crosslinked phenoxyphosphazene compound obtained above did not show a definite melting point, and showed a decomposition starting temperature of 305° C. as determined by TG/DTA analysis. It was found from the phosphorus content and CHN elemental analysis data that approximate composition of this crosslinked phenoxyphosphazene compound was $[N=P(-O-p-Ph-O-)_{0.15}(-O-Ph)_{1.7}]$.

SYNTHESIS EXAMPLE 2

(Preparation of Compound B: phenoxyphosphazene compound having 2,2-bis(p-oxyphenyl)propane-crosslinked structure)

A 86.7 g-quantity of bisphenol-A (0.38 mole) and 460 ml of tetrahydrofuran (THF) were placed in a 4-necked, 2-liter flask, and while maintaining the internal temperature at 19° C., 3.5 g (0.5 mole) of Li metal in the form of cut pieces was added thereto with stirring. After the completion of the addition, the temperature was elevated to 61° C. over 1 hour, and the stirring was continued for 4 hours at 61° C. to 68° C. After the reaction was completed, the resulting reaction mixture containing lithium salt of bisphenol-A became a white slurry form.

A 215.6 g-quantity of phenol (2.25 moles) and 500 ml of toluene were placed in a 4-necked, 3-liter flask, and while maintaining the internal temperature at 25° C., 34.5 g (1.5 moles) of sodium metal in the form of cut pieces was added thereto with stirring. After completion of the addition, the temperature was elevated to 77° C. over 4 hours, and the stirring was continued for 3 hours at 77° C. to 113° C. After the reaction was completed, the reaction mixture containing sodium phenolate became a white slurry form.

A 313.13 g (1.0 mole) quantity of dichlorophosphazene oligomers (concentration 37.01%, monochlorobenzene solution, a mixture of 58.57% of trimer, 12.26% of tetramer, 11.11% of pentamer and hexamer, 2.82% of heptamer, 12.04% of octamer and higher oligomers) was placed in a 4-necked, 5-liter flask, and while maintaining the internal temperature at 20° C., the solution of lithium salt of bisphenol-A was added dropwise thereto over 1 hour with stirring, whereby the content became a pale yellow milk form. Then, while maintaining the internal temperature at 20° C., the sodium phenolate solution was added dropwise thereto over 1 hour with strring, whereby the content became a brown slurry form. After the dropwise addition, the stirring was continued for 13 hours at 47° C., whereby the content became a pale brown slurry form.

After the reaction was completed, the reaction mixture was concentrated, and the concentrate was washed three times with 3 liters of a 2% NaOH, filtered, washed three times with 3 liters of a mixture of water/methanol (1/1 by volume), filtered, and subjected to a vacuum drying with heating at 80° C. at 20 mmHg for 11 hours to give a white powder.

Yield: 208.67 g

Yield based on dichlorophosphazene: 86.50%

The obtained compound had a hydrolyzable chlorine content of 0.93%, a decomposition temperature of 296.0° C., and a 5% weight loss temperature of 307.7° C. It was found from the phosphorus content and CHN elemental analysis data that the composition of the final product was [N=P(—O—Ph—C(CH$_3$)$_2$—Ph—O—)$_{0.25}$(—O—Ph)$_{1.50}$].

SYNTHESIS EXAMPLE 3

(Preparation of Compound C: phenoxyphosphazene compound having m-phenylene-crosslinked structure)

Following the procedure of Synthesis Example 1 and using resorcinol in place of hydroquinone, reaction and workup were carried out, thereby giving a product represented by the formula [N=P(—O—m—Ph—O—)$_{0.15}$(—O—Ph)$_{1.7}$] as a white powder. This crosslinked phenoxyphosphazene compound did not show a definite melting point, and showed a decomposition starting temperature of 300° C. as determined by TG/DTA analysis.

EXAMPLE 1

A flame-retardant resin composition was prepared by adding 15 parts of Compound A prepared in Synthesis Example 1 and 0.2 part of PTFE to a resin comprising 75 parts of an aromatic polycarbonate resin and 25 parts of ABS resin, mixing the components in a mixer, and melting and kneading the mixture by means of a laboplasto mill.

This composition was made into test pieces having a thickness of ⅛ inch by a heat-press. The test pieces were evaluated for flame retardancy according to the test method of UL-94 and the heat distortion temperature thereof was measured according to ASTM D-648.

As a result, the flame retardancy was V-0, and the heat distortion temperature was 108° C. Juicing was not observed during the molding processing of this resin composition.

EXAMPLE 2

A flame-retardant resin composition was prepared following the procedure of Example 1 and using Compound B prepared in Synthesis Example 2 in place of Compound A. Furthermore, following the procedure of Example 1, test pieces were prepared therefrom, and the evaluation of the flame retardancy thereof and measurement of the heat distortion temperature thereof were carried out.

As a result, the flame retardancy was V-0, and the heat distortion temperature was 111° C. Juicing was not observed during the molding processing of this resin composition.

EXAMPLE 3

A flame-retardant resin composition was prepared following the procedure of Example 1 and using Compound C prepared in Synthesis Example 3 in place of Compound A. Furthermore, following the procedure of Example 1, test pieces were prepared therefrom, and the evaluation of the flame retardancy thereof and measurement of the heat distortion temperature thereof were carried out.

As a result, the flame retardancy was V-0, and the heat distortion temperature was 106° C. Juicing was not observed during the molding processing of this resin composition.

EXAMPLE 4

A flame-retardant resin composition was prepared in the same manner as in Example 1 except that PTFE was not added. Furthermore, following the procedure of Example 1, test pieces were prepared therefrom, and the evaluation of the flame retardancy thereof and measurement of the heat distortion temperature thereof were carried out.

As a result, the flame retardancy was V-0, and the heat distortion temperature was 109° C. Juicing was not observed during the molding processing of this resin composition.

COMPARATIVE EXAMPLE 1

A resin composition was prepared following the procedure of Example 1 and using trixylyl phosphate in place of Compound A. Furthermore, following the procedure of Example 1, test pieces were prepared therefrom, and the evaluation of the flame retardancy thereof and measurement of the heat distortion temperature thereof were carried out.

As a result, the flame retardancy was V-2, and the heat distortion temperature was 82° C. Juicing was observed during the molding processing of this resin composition.

REFERENCE EXAMPLE 1

Into a flask equipped with a stirrer, a condenser, a dropping funnel and a thermometer was simultaneously fed 460 g (3 moles) of phosphorus oxychloride, 110 g (2 moles) of resorcinol, 94.1 g (1 mole) of phenol and 9 g of aluminum chloride (catalyst), and the mixture was subjected to reaction until the temperature became 150° C., and then 564.6 g (6 moles) of phenol was added thereto for effecting the reaction. The reaction mixture was washed with water, and the triphenyl phosphate was distilled off in a vacuum at a high temperature to give 515 g of a condensed phosphoric acid diphenyl ester crosslinked by resocinol.

The condensed phosphoric acid diphenyl ester was a yellow liquid, had an average molecular weight of 540, a P content of 10.6% and an acid value of 2.2.

COMPARATIVE EXAMPLE 2

A resin composition was prepared following the procedure of Example 1 and using the condensed phosphoric acid diphenyl ester crosslinked by resocinol (prepared in Reference Example 1) in place of Compound A. Furthermore, following the procedure of Example 1, test pieces were prepared therefrom, and the evaluation of the flame retardancy thereof and measurement of the heat distortion temperature thereof were carried out.

As a result, the flame retardancy was V-2, and the heat distortion temperature was 89° C. Juicing was observed during the molding processing of this resin composition.

COMPARATIVE EXAMPLE 3

A resin composition was prepared in the same manner as in Example 1 except that no flame retardant was added. Furthermore, following the procedure of Example 1, test pieces were prepared therefrom, and the evaluation of the flame retardancy thereof was carried out, whereby the test piece burned, exhibiting no flame retardancy at all. The heat distortion temperature of the test piece was 111° C.

EXAMPLE 5

To a resin comprising 70 parts of poly(2,6-dimethyl-1,4-phenylene)oxide and 30 parts of rubber-modified impact resistant polystyrene was added 15 parts of Compound A, and the components were mixed in a mixer. The mixture was melted and kneaded by means of laboplasto mill to thereby give a flame-retardant resin composition.

This resin composition was made into a test piece having a thickness of ⅛ inch by a heat-press. The test piece was evaluated for flame retardancy according to the test method of UL-94 and the heat distortion temperature thereof was measured according to ASTM D-648.

As a result, flame retardancy was V-0, and the heat distortion temperature was 130° C. Juicing was not observed during the molding processing of this resin composition.

EXAMPLE 6

A flame-retardant resin composition was prepared following the procedure of Example 5 and using Compound B in place of Compound A. Furthermore, following the procedure of Example 5, test pieces were prepared therefrom, and the evaluation of the flame retardancy thereof and measurement of the heat distortion temperature thereof were carried out.

As a result, the flame retardancy was V-0, and the heat distortion temperature was 131° C. Juicing was not observed during the molding processing of this resin composition.

EXAMPLE 7

A flame-retardant resin composition was prepared following the procedure of Example 5 and using Compound C in place of Compound A. Furthermore, following the procedure of Example 5, test pieces were prepared therefrom, and the evaluation of the flame retardancy thereof and measurement of the heat distortion temperature thereof were carried out.

As a result, the flame retardancy was V-0, and the heat distortion temperature was 128° C. Juicing was not observed during the molding processing of this resin composition.

COMPARATIVE EXAMPLE 4

A resin composition was prepared following the procedure of Example 5 and using triphenyl phosphate in place of Compound A. Furthermore, following the procedure of Example 5, test pieces were prepared therefrom, and the evaluation of the flame retardancy thereof and measurement of the heat distortion temperature thereof were carried out.

As a result, the flame retardancy was V-2, and the heat distortion temperature was 110° C. Juicing was observed during the molding processing of this resin composition.

COMPARATIVE EXAMPLE 5

A resin composition was prepared following the procedure of Example 5 and using the condensed phosphoric acid diphenyl ester crosslinked by resocinol (prepared in Reference Example 1) in place of Compound A. Furthermore, following the procedure of Example 5, test pieces were prepared therefrom, and the evaluation of the flame retardancy thereof and measurement of the heat distortion temperature thereof were carried out.

As a result, the flame retardancy was V-2, and the heat distortion temperature was 115° C. Juicing was observed during the molding processing of this resin composition.

COMPARATIVE EXAMPLE 6

A resin composition was prepared in the same manner as in Example 5 except that no flame retardant was added. Furthermore, following the procedure of Example 5, test pieces were prepared therefrom, and the evaluation of the flame retardancy thereof was carried out, whereby the test piece burned, exhibiting no flame retardancy at all. The heat distortion temperature of test piece was 133° C.

EXAMPLE 8

A varnish was prepared by adding 10 parts of Compound A to 100 parts of bisphenol-A type epoxy resin. A glass cloth was impregnated with the varnish and the impregnated glass cloth was dried to prepare a prepreg. Subsequently, a prescribed number of pieces of the prepregs were laminated on one another and the laminate was subjected to a heat-press processing at 160° C. or above to give a glass epoxy board having a thickness of 1/16 inch, which was cut into test pieces of predetermined size.

Evaluation of these test pieces for flame retardancy according to the test method of UL-94 revealed that the flame retardancy thereof was V-O. Juicing was not observed during the heat-press processing of this resin composition.

EXAMPLE 9

Test pieces were prepared following the procedure of Example 8 and using Compound C in place of Compound A, and the evaluation of the flame retardancy thereof was carried out.

As a result, the flame retardancy was V-0. Juicing was not observed during the heat-press processing of this resin composition.

COMPARATIVE EXAMPLE 7

Test pieces were prepared following the procedure of Example 8 and using the condensed phosphoric acid diphenyl ester crosslinked by resocinol (prepared in Reference Example 1) in place of Compound A, and the evaluation of the flame retardancy thereof was carried out.

As a result, the flame retardancy was V-2. Juicing was observed during the heat-press processing of this resin composition.

COMPARATIVE EXAMPLE 8

Test pieces were prepared in the same manner as in Example 8 except that no flame retardant was added, and the evaluation of the flame retardancy thereof was carried out. The test piece burned, exhibiting no flame retardancy at all.

EXAMPLES 10 TO 13

Flame retardancy tests were carried out following the procedure of Example 1 and using the compounds represented by —[—N=P(—O-crosslinking group-O—)$_x$(—O—Ph)$_y$—]$_n$—, which was synthesized following the procedure of Synthesis Example 2. The results are shown in Table 1.

TABLE 1

| Example | Crosslinking group | x | y | Mw | Tm (° C.) | T5 (° C.) | Td (° C.) | Flame retardancy UL-94 |
|---|---|---|---|---|---|---|---|---|
| 10 | m-phenylene | 0.002 | 1.996 | 670 | 103 | 343 | 366 | V-0 |
| 11 | p-phenylene | 0.002 | 1.996 | 730 | 102 | 338 | 350 | V-0 |
| 12 | p-phenylene | 0.007 | 1.986 | 710 | 103 | 353 | 360 | V-0 |
| 13 | p-phenylene | 0.021 | 1.958 | 710 | 101 | 352 | 365 | V-0 |

In Table 1, Tm (° C.) is the melting temperature as determined by thermogravimetric analysis (TG/DTA analysis), T5 (° C.) is the temperature at which 5% weight loss occurred as determined by thermogravimetric analysis, Td (° C.) is the decomposition temperature as determined by thermogravimetric analysis.

As shown in Table 1, the moldability each of the resin compositions containing the flame retardant comprising the compounds represented by the above general formula was good, and juicing was not observed.

SYNTHESIS EXAMPLE 4

(Synthesis of Compound D; phenoxy-phosphazene having 4,4'-sulfonyldiphenylene-(bisphenol-S residue)crosslinked structure)

In a 4-necked, 1-liter flask, 1.28 moles (121.14 g) of phenol and 0.017 mole (4.26 g) of bisphenol-S were dissolved in 500 ml of tetrahydrofuran (THF), and 7.6 g of sodium metal in the form of cut pieces was added thereto at 25° C. or lower. After the completion of the addition, the temperature was elevated to 61° C. over 1 hour, and the stirring was continued for 6 hours at 61° C. to 68° C. to prepare a sodium phenolate mixed solution.

In parallel with the above reaction, 290 g of a 20% chlorobenzene solution containing 0.5 unit mole (58 g) of dichlorophosphazene oligomers (a mixture of 58.57% of trimer, 12.26% of tetramer, 11.11% of pentamer and hexamer, 2.82% of heptamer, 12.04% of octamer and higher oligomers) was placed in a 4-necked, 2-liter flask, and the above-mentioned sodium phenolate mixed solution, previously prepared, was added dropwise thereto with stirring and with cooling at 25° C. or lower. After the dropwise addition, the mixture was subjected to a reaction with stirring at 71 to 73° C. for 15 hours.

After the completion of the reaction, the reaction mixture was concentrated, and the concentrate was re-dissolved in 500 ml of chlorobenzene. Then, the solution was washed sequentially with water, with a 5% aqueous NaOH solution three times, with a 5% sulfuric acid, with a 5% aqueous sodium hydrogencarbonate solution and with water three times, and concentrated to dryness to give 108 g of a pale yellow waxy product.

Yield: 93.5%.

This product had a weight average molecular weight (Mw) of 810 as determined by GPC analysis based on polystyrene standards, and a melting temperature (Tm) of 103° C. as determined by TG/DTA analysis, and the 5% weight loss temperature (T5) and the decomposition starting temperature (Td) of the product were 330 and 347° C., respectively.

The product had a residual chlorine content of 0.09%. It was determined from the phosphorus content and CHN elemental analysis data that the approximate composition of this product was [N=P(—O—Ph—SO$_2$—Ph—O—)$_{0.025}$(—O—Ph)$_{1.95}$].

SYNTHESIS EXAMPLES 5 TO 6

(Preparation of Compound E and Compound F: phenoxyphosphazene having 4,4'-sulfonyldiphenylene-(bisphenol-S residue) crosslinked structure)

Pale yellow waxy products were prepared following the reaction and work-up procedures of Synthesis Example 4 and using 1.254 moles (118.03 g) of phenol and 0.033 mole (8.26 g) of bisphenol-S [or 1.122 moles (105.60 g) of phenol and 0.099 mole (24.77 g) of bisphenol-S]. It was confirmed from the analysis results that the following compounds were obtained.

Compound E:
[N=P(—O—Ph—SO$_2$—Ph—O—)$_{0.05}$(—O—Ph)$_{1.90}$]
    Yield: 91.5%, residual chlorine=0.01% or
    less, Mw=820, Tm=103° C., T5=332° C.,
    Td=347° C.

Compound F:
[N=P(—O—Ph—SO$_2$—Ph—O—)0.15(—O—Ph)$_{1.70}$]
    Yield: 90.0%, residual chlorine=0.11%,
    Mw=850, Tm=102° C., T5=333° C.,
    Td=355° C.

SYNTHESIS EXAMPLES 7 to 8

(Preparation of Compound G and Compound H: phenoxyphosphazene having 4,4'-oxydiphenylene group-crosslinked structure)

The following highly viscous compounds were prepared following the reaction and work-up procedures of Synthesis Example 4 on the same scale and using 13.4 g (0.066 mole) of bis(4-hydroxyphenyl)ether and 111.7 g (1.188 moles) of phenol [or 26.8 g (0.132 mole) of bis(4-hydroxyphenyl)ether and 99.3 g (1.056 moles) of phenol] and 27.6 g (1.2 moles) of Na metal.

Compound G:
[N=P(—O—Ph—O—Ph—O—)0.1(—O—Ph)$_{1.8}$]
    Yield: 99.8%, residual chlorine=0.01% or
    less, Mw=1510, Tm=not detected,
    T5=346° C., Td=353° C.

Compound H:
[N=P(—O—Ph—O—Ph—O—)$_{0.2}$(—O—Ph)$_{1.6}$]

Yield: 97.9%, residual chlorine=0.11%,

Mw=1950, Tm=not detected,

T5=318° C., Td=375° C.

SYNTHESIS EXAMPLES 9 to 10

(Preparation of Compound I and Compound J: phenoxyphosphazene having 4,4'-thiodiphenylene group-crosslinked structure)

The following highly viscous compounds were prepared following the reaction and work-up procedures of Synthesis Examples 7 and 8 and using 14.4 g (0.066 mole) [or 28.8 g (0.132 mole)] of thiodiphenol.

Compound I:
[N=P(—O—Ph—S—Ph—O—)$_{0.1}$(—O—Ph)$_{1.8}$]

Yield: 98.8%, residual chlorine=0.09%,

Mw=1690, Tm=not detected,

T5=340° C., Td=344° C.

Compound J:
[N=P(—O—Ph—S—Ph—O—)$_{0.2}$(—O—Ph)$_{1.6}$]

Yield: 95.1%, residual chlorine=0.01%,

Mw=3050, Tm=not detected,

T5=344° C., Td=348° C.

SYNTHESIS EXAMPLES 11 TO 12

(Preparation of Compound K and Compound L: phenoxyphosphazene having 4,4'-diphenylene group-crosslinked structure)

The following highly viscous compounds were prepared following the reaction and work-up procedures of Synthesis Examples 7 and 8 and using 12.3 g (0.066 mole) [or 24.6 g (0.132 mole)] of 4,4'-diphenol.

Compound K:
[N=P(—O—Ph—Ph—O—)$_{0.1}$(—O—Ph)$_{1.8}$]

Yield: 99.9%, residual chlorine=0.01%,

Mw=1590, Tm=not detected,

T5=348° C., Td=349° C.

Compound L:
[N=P(—O—Ph—Ph—O—)$_{0.2}$(—O—Ph)$_{1.6}$]

Yield: 97.0%, residual chlorine=0.11%,

Mw=1900, Tm=not detected,

T5=345° C., Td=347° C.

EXAMPLE 14

A flame-retardant resin composition was prepared by adding 15 parts of phenoxyphosphazene having 4,4'-sulfonyldiphenylene(bisphenol-S residue)-crosslinked structure (Compound D) and 0.5 part of PTFE to a resin comprising 75 parts of an aromatic polycarbonate resin and 25 parts of ABS resin, mixing the components in a mixer, and melting and kneading the mixture by means of a laboplasto mill.

This composition was made into test pieces having a thickness of 1/8 inch by a heat-press. The test pieces were evaluated for flame retardancy according to the test method of UL-94 and the heat distortion temperature thereof was measured according to ASTM D-648.

As a result, the specimens did not permit dripping of molten resin so that the flame retardancy was V-0, and the heat distortion temperature was 111° C. Juicing was not observed during the molding of this resin composition.

EXAMPLE 15

A flame-retardant resin composition was prepared in the same manner as in Example 14 except that 18 parts of Compound E were used without using PTFE. Furthermore, following the procedure of Example 14, test pieces were prepared therefrom, and the evaluation of the flame retardancy thereof and measurement of the heat distortion temperature thereof were carried out.

As a result, the test pieces did not give flaming drips capable of igniting cotton so that the flame retardancy was V-0, and the heat distortion temperature was 112° C. Juicing was not observed during the molding of this resin composition. The results confirm that said compound is capable of exhibiting the desired flame-retardancy without using PTFE, and demonstrate that said compound is a true non-halogen-based flame retardancy-imparting agent.

EXAMPLES 16 TO 22

Flame-retardant resin compositions were prepared following the procedure of Example 14 and using Compounds F–L. Furthermore, following the procedure of Example 14, test pieces were prepared therefrom, and the evaluation of the flame retardancy thereof and measurement of the heat distortion temperature thereof were carried out.

The results are shown in Table 2.

TABLE 2

| Ex. | Flame retardant | Flame retardancy | Juicing | Heat distortion temperature |
|---|---|---|---|---|
| 16 | Compound F | V-0 | none | 115° C. |
| 17 | Compound G | V-0 | none | 112° C. |
| 18 | Compound H | V-0 | none | 113° C. |
| 19 | Compound I | V-0 | none | 110° C. |
| 20 | Compound J | V-0 | none | 111° C. |
| 21 | Compound K | V-0 | none | 114° C. |
| 22 | Compound L | V-0 | none | 115° C. |

EXAMPLE 23

To a resin comprising 70 parts Of poly(2,6-dimethyl-1,4-phenylene)oxide and 30 parts of rubber-modified impact resistant polystyrene was added 15 parts of Compound E, i.e., phenoxyphosphazene having crosslinked structure, and the components were mixed in a mixer. The mixture was melted and kneaded by means of a laboplasto mill to thereby give a flame-retardant resin composition.

This resin composition was made into test piece having a thickness of 1/8 inch by a heat-press. The test pieces were evaluated for flame retardancy according to the test method of UL-94 and the heat distortion temperature thereof was measured according to ASTM D-648.

As a result, flame retardancy was V-0, and the heat distortion temperature was 131° C. Juicing was not observed during the molding of this resin composition.

EXAMPLE 24

A flame-retardant resin composition was prepared following the procedure of Example 23 and using compound H in place of Compound E. Furthermore, following the procedure of Example 23, test pieces were prepared therefrom, and the evaluation of the flame retardancy thereof and measurement of the heat distortion temperature thereof were carried out.

As a result, the flame retardancy was V-0, and the heat distortion temperature was 133° C. Juicing was not observed during the molding of this resin composition.

EXAMPLE 25

A flame-retardant resin composition was prepared following the procedure of Example 23 and using compound J in place of Compound E. Furthermore, following the procedure of Example 23, test pieces were prepared therefrom, and the evaluation of the flame retardancy thereof and measurement of the heat distortion temperature thereof were carried out.

As a result, the flame retardancy was V-0, and the heat distortion temperature was 130° C. Juicing was not observed during the molding of this resin composition.

EXAMPLE 26

A varnish was prepared by adding 10 parts of Compound D to 100 parts of bisphenol-A type epoxy resin. A glass cloth was impregnated with the varnish and then the impregnated glass cloth was dried to thereby produce a prepreg. Subsequently, a prescribed number of pieces of the prepregs were laminated on one another and the laminate was subjected to a heat-press processing at a temperature of 160° C. or higher to prepare a glass epoxy board having a thickness of 1/16 inch, and the board was then cut into pieces of a predetermined size for use as a test piece. The test piece was evaluated for flame retardancy according to the test method of UL-94.

As a result, the flame retardancy was V-0, and juicing was not observed during the heat-press processing of this resin composition.

EXAMPLE 27

Following the procedure of Example 26 and using compound H in place of Compound E, test piece was prepared to evaluate the flame retardancy.

As a result, the flame retardancy was V-0, and juicing was not observed during the heat-press processing of this resin composition.

EXAMPLE 28

Following the procedure of Example 26 and using compound J in place of Compound E, test piece was prepared to evaluate the flame retardancy.

As a result, the flame retardancy was V-0, and juicing was not observed during the heat-press processing of this resin composition.

SYNTHESIS EXAMPLE 13

(Synthesis of chlorophosphazene)

99.5% phosphorus pentachloride ($PCl_5$) (12 moles, 2512 g), 99.5% ammonium chloride ($NH_4Cl$) (12.8 moles, 688 g), 97.0% zinc chloride ($ZnCl_2$) (0.16 mole, 20 g) and monochlorobenzene (MCB) (5 liters) were placed in a reaction vessel equipped with a temperature controller, a stirrer and a refluxing device. Reaction was commenced at 24° C., and the temperature was gradually raised, to finally reach 130° C. over a period of 3 hours from the start of the reaction. Reflux was continued with stirring at 130° C.–134° C. for two hours, and the reaction mixture was filtered to remove 76 g of a white residue, thereby giving 6883 g of chlorophosphazene as an almost colorless transparent solution in MCB (1343 g, calculated as 100% chlorophosphazene; chlorophosphazene concentration in the solution: 19.51%). Yield: 96.56% (relative to phosphorus pentachloride)

Analysis by $^{31}P$-NMR revealed that trimer m=3 (wherein m represents m as defined in the foregoing general formula): 54%, tetramer m=4: 19%, pentamer m≧5: 27%.

Said solution was concentrated to give a 39.5% solution of chlorophosphazene for use as the starting material in Synthesis Example 14.

SYNTHESIS EXAMPLE 14

(Synthesis of phenoxyphosphazene)

Phenol (PhOH) (31.14 moles, 2931 g), Na metal (25.95 moles, 596.67 g) and tetrahydrofuran (THF) (7 liters) were fed into a reaction vessel equipped with a temperature controller, a stirrer and a refluxing device, and the mixture was refluxed with stirring for 8 hours. The reaction mixture solution turned slightly colored. To this solution was added dropwise, at a temperature of 42° C. to 79° C., a solution prepared by dissolving said 39.5% solution containing chlorophosphazene prepared in Synthesis Example 13 (3172.41 g) in 5.5 liters of THF. After the dropwise addition was completed, reflux was continued with stirring at 78° C. for 10 hours.

Subsequently, the reaction mixture was concentrated and then dissolved in 8 liters of monochlorobenzene, 5 liters of water and 3 liters of a 5% aqueous NaOH solution. The resultant mixture was successively washed in the following order: twice with 7 liters of a 5% aqueous NaOH solution, once with 7 liters of a 5% hydrochloric acid, once with 7 liters of a 7% aqueous $NaHCO_3$ solution and twice with 7 liters of water. After the washing, the resulting mixture was dried by adding $MgSO_4$ and then concentrated. Finally, the concentrate was dried at 80° C. in a vacuum at a pressure of 3 torr or lower for 12 hours, to give 2437 g of phenoxyphosphazene in the form of a yellow sherbet.

Yield: 97.5%

Analytical results are as follows. Analysis by $^{31}P$-NMR revealed the following: trimer m=3: 55%, tetramer m=4: 18%, pentamer m≧5: 27%, weight average molecular weight Mw=720 by GPC, mp=109° C., 5% weight loss temperature Td (5%)=343° C., decomposition temperature Td=366° C., percentage of residue after heat decomposition (600° C.)=19%, residual PhOH=0.038 wt %, residual MCB=0.042 wt %, residual chlorine=0.102%.

EXAMPLE 29

A flame-retardant resin composition was prepared by adding 15 parts of phenoxyphosphazene prepared in Synthesis Example 14, as a flame retardant, and 7.5 parts of potassium titanate fibers (produced by Otsuka Chemical Co., Ltd., trade name: TISMO N-102, the same applies hereinafter) to a resin comprising 75 parts of an aromatic polycarbonate resin and 25 parts of ABS resin, mixing the components in a mixer, and melting and kneading the mixture by means of a laboplasto mill.

This composition was made into test pieces having a thickness of 1/16 inch by a heat-press. The test pieces were evaluated for flame retardancy according to the test method of UL-94 and the heat distortion temperature thereof was measured according to ASTM D-648. Furthermore, the test pieces were evaluated for the presence or absence of flaming particles (drips) which ignite cotton during the test for flame retardancy, the presence or absence of generation of volatile gases during kneading by a laboplasto mill and any change in the appearance after forming the test pieces. The results are shown in Table 3.

EXAMPLES 30 TO 31

A flame-retardant resin composition was prepared in the same manner as in Example 29 except that kaolin (a reagent produced by Wako Pure Chemical Industrie, Ltd.) or Mica (tradename: Clarite Mica 400W, produced by Kuraray Co., Ltd.) was used in place of the potassium titanate fibers. The obtained compositions were evaluated for their perfomances in the same manner as in Example 29. The results are shown in Table 3.

EXAMPLES 32 TO 35

Flame-retardant resin compositions were prepared following the procedure of Example 29 and using each of Compounds E–H in place of the phenoxyphosphazene of Synthesis Example 2. The obtained compositions were evaluated for their performances in the same manner as in Example 29. The results are shown in Table 3.

EXAMPLE 36

A flame-retardant resin composition was prepared following the procedure of Example 29 and using a resin comprising 60 parts of poly (2,6-dimethyl-1,4-phenylene)oxide and 40 parts of rubber modified impact resistant polystyrene in place of the resin comprising polycarbonate resin and ABS resin. The obtained composition was evaluated for their performances in the same manner as in Example 29. The results are shown in Table 3.

EXAMPLE 37

A varnish was prepared by adding 15 parts of the phenoxyphosphazene prepared in Synthesis Example 14 and 7.5 parts of potassium titanate fibers to 100 parts of bisphenol-A type epoxy resin. A glass cloth was impregnated with the varnish and the impregnated glass cloth was dried to prepare a prepreg. Subsequently, a prescribed number of pieces of the prepregs were laminated on one another, and the laminate was pressed with heating to give a glass-epoxy board having a thickness of 1/16 inch, and the board was cut into test pieces of predetermined size. These test pieces were subjected to the flame test according to the test method of UL-94, and the heat distortion temperature was measured according to the above-mentioned method. The results are shown in Table 3.

COMPARATIVE EXAMPLE 9

A resin composition was prepared in the same manner as in Example 29 except that potassium titanate fibers were not added. The performances of the composition were evaluated as described in Example 29. The results are shown in Table 3.

COMPARATIVE EXAMPLE 10

A resin composition was prepared in the same manner as in Example 36 except that potassium titanate fibers were not added. The performances of the composition were evaluated as described in Example 29. The results are shown in Table 3.

COMPARATIVE EXAMPLE 11

A resin composition was prepared in the same manner as in Example 37 except that potassium titanate fibers were not added. The performances of the composition were evaluated as described in Example 29. The results are shown in Table 3.

TABLE 3

| | Flame retardancy (UL-94) | Degree of dripping | Heat distortion temperature (° C.) | Volatization of gas during molding | Discoloration during molding | Juicing |
|---|---|---|---|---|---|---|
| Ex. | | | | | | |
| 29 | V-0 | Not dripped | 121 | Not volatilized | Not discolored | none |
| 30 | V-0 | Not dripped | 128 | Not volatilized | Not discolored | none |
| 31 | V-0 | Not dripped | 124 | Not volatilized | Not discolored | none |
| 32 | V-0 | Not dripped | 119 | Not volatilized | Not discolored | none |
| 33 | V-0 | Not dripped | 120 | Not volatilized | Not discolored | none |
| 34 | V-0 | Not dripped | 118 | Not volatilized | Not discolored | none |
| 35 | V-0 | Not dripped | 124 | Not volatilized | Not discolored | none |
| 36 | V-0 | Not dripped | 140 | Not volatilized | Not discolored | none |
| 37 | V-0 | Not dripped | — | Not volatilized | Not discolored | none |
| Comp. Ex. | | | | | | |
| 9 | V-2 | Dripped | 117 | Volatilized | Discolored | none |
| 10 | V-2 | Dripped | 139 | Volatilized | Not discolored | none |
| 11 | V-2 | Not dripped | — | Not volatilized | Not discolored | none |

SYNTHESIS EXAMPLE 15

(Synthesis of 4-cyanophenoxy group-containing phenoxyphosphazene)

A 4-necked, 2-liter flask equipped with a stirrer, a heater, a thermometer and a dehydrator was charged with 0.44 mole (52.4 g) of 4-cyanophenol, 2.20 moles (207.0 g) of phenol, 2.64 moles (105.6 g) of sodium hydroxide and 1000 ml of toluene. The mixture was refluxed with heating so as to remove water from the system to thereby prepare a solution of sodium salts of cyanophenol and phenol in toluene.

To the solution of sodium salts of cyanophenol and phenol in toluene was added dropwise 580 g of a 20% solution containing 1 unit mole (115.9 g) of dichlorophosphazene oligomers (a mixture of 59% of trimer, 12% of tetramer, 11% of pentamer and hexamer, 3% of heptamer and 15% of octamer and higher cyclic and straight-chain compounds) in chlorobenzene with stirring while maintaining the internal temperature at 30° C. or lower. This mixed solution was refluxed for 12 hours, and then the reaction mixture was washed twice by adding a 5% aqueous solution of sodium hydroxide. Subsequently, the organic layer was neutralized with dilute sulfuric acid, washed twice with water, filtered, concentrated and dried in a vacuum (the condition of the vacuum drying: 80° C., 5 mmHg, 12 hours) to give 220 g of a pale yellow viscous liquid. The yield calculated based on the dichlorophosphazene oligomers used was 92%.

The product had a residual hydrolyzable chlorine content of 0.09%, showed $^1$H-NMR spectral peaks in the range of 7.6 to 6.6 ppm and $^{31}$P-NMR spectral peaks in the range of 10 to 6, −11 to −14 and −16 to −21 ppm, and had a weight average molecular weight of 1500 as determined by GPC based on polystyrene standards.

It was confirmed from the results of carbon, hydrogen, nitrogen and phosphorus elemental analysis that the composition of the product was [N=P(OC$_6$H$_4$CN)$_{0.33}$(OPh)$_{1.67}$]. This composition was in agreement with the ratio of 4-cyanophenol and phenol fed, so that the desired compound was synthesized. The product did not show a definite melting point, and showed a decomposition temperature of 327° C. as determined by TG/DTA analysis.

SYNTHESIS EXAMPLES 16 TO 19

4-Cyanophenoxy group-containing phenoxyphosphazene compounds were synthesized following the procedure of Synthesis Example 15 and varying the ratio of 4-cyanophenol and phenol used. The results are shown in Table 4.

From the results of carbon, hydrogen, nitrogen, chlorine and phosphorus elemental analysis and of the measurement of $^1$H-NMR and $^{31}$P-NMR spectra, it was confirmed that the compositions of these products were in agreement with the ratio of 4-cyanophenol and phenol fed and that the desired compounds were synthesized, respectively.

TABLE 4

| | Synthesis Example | | | |
|---|---|---|---|---|
| | 16 | 17 | 18 | 19 |
| 4-Cyanophenol (mole) | 0.88 | 1.32 | 1.76 | 2.20 |
| Phenol (mole) | 1.76 | 1.32 | 0.88 | 0.44 |
| Yield (%) | 95 | 96 | 95 | 95 |
| Hydrolyzable chlorine (%) | 0.08 | 0.11 | 0.15 | 0.06 |
| Property | Resinoid | Solid | Solid | Solid |
| Weight-average molecule weight | 1000 | 1050 | 1130 | 1210 |
| Melting point (° C.) | Not detected | Not detected | Not detected | 248 |
| Decomposition temp. (° C.) | 358 | 373 | 367 | 411 |

SYNTHESIS EXAMPLE 20

4-Cyanophenoxy group-containing isopropylphenoxyphosphazene compound was synthesized following the procedure of Synthesis Example 15 and using 4-isopropylphenol in place of phenol used in Synthesis Example 15. The result is shown in Table 5. From the results of carbon, hydrogen, nitrogen, chlorine and phosphorus elemental analysis and of the measurement of $^1$H-NMR and $^{31}$P-NMR spectra, it was confirmed that the composition of this product was in agreement with the ratio of 4-cyanophenol and 4-isopropylphenol fed and that the desired compound was synthesized.

SYNTHESIS EXAMPLE 21

4-Cyanophenoxy group-containing naphthoxyphosphazene compound was synthesized following the procedure of Synthesis Example 15 and using 2-naphthol in place of phenol used in Synthesis Example 15. The result is shown in Table 5.

From the results of carbon, hydrogen, nitrogen, chlorine and phosphorus elemental analysis and of the measurement of $^1$H-NMR and $^{31}$P-NMR spectra, it was confirmed that the composition of this product was in agreement with the ratio of 4-cyanophenol and 2-naphthol fed and that the desired compound was synthesized.

SYNTHESIS EXAMPLE 22

4-Cyanophenoxy group-containing propoxyphosphazene compound was synthesized in the same manner as in Synthesis Example 15 with the exception of using n-propanol in place of phenol used in Synthesis Example 15 and using 2-cyanophenol in place of 4-cyanophenol and also with the exception of preparing the sodium salts of these with use of sodium metal. The result is shown in Table 5.

From the results of carbon, hydrogen, nitrogen and phosphorus elemental analysis and of the measurement of $^1$H-NMR and $^{31}$P-NMR spectra, it was confirmed that the composition of this product was in agreement with the ratio of 2-cyanophenol and n-propanol fed and that the desired compound was synthesized.

SYNTHESIS EXAMPLE 23

4-Cyanophenoxy group-containing ethylhexyloxyphosphazene compound was synthesized in the same manner as in Synthesis Example 15 with the exception of using 2-ethylhexanol in place of phenol used in Synthesis Example 15 and also with the exception of preparing the sodium salts of 2-ethylhexanol and 4-cyanophenol with use of metallic sodium. The result was shown in Table 5.

From the results of carbon, hydrogen, nitrogen, chlorine and phosphorus elemental analysis and of the measurement of $^1$H-NMR and $^{31}$P-NMR spectra, it was confirmed that the composition of this product was in agreement with the ratio of 4-cyanophenol and 2-ethylhexanol fed and that the desired compound was synthesized.

SYNTHESIS EXAMPLE 24

4-Cyanophenoxy group-containing phosphazene compound was synthesized in the same manner as in Synthesis Example 15 with the exception of using 2.00 moles of 2-allylphenol and 0.20 mole of n-propanol in place of 2.20 moles of phenol used in Synthesis Example 15 and also with the exception of preparing the sodium salts of 2-allylphenol, n-propanol and 4-cyanophenol with use of sodium metal. The results was shown in Table 5.

From the results of carbon, hydrogen, nitrogen, chlorine and phosphorus elemental analysis and the measurement of $^1$H-NMR and $^{31}$P-NMR spectra, it was confirmed that the composition of this product was in agreement with the ratio of 4-cyanophenol, 2-allylphenol and n-propanol fed and that the desired compound was synthesized.

SYNTHESIS EXAMPLE 25

Dichlorophosphazene polymer was prepared by heating 1.5 moles (521.6 g) of hexachlorocyclotriphosphazene at 250° C. for 12 hours in an atmosphere of nitrogen to conduct ring-opening polymerization. Unreacted hexachlorocyclotriphosphazene was removed by sublimation at 70° C. for 7 hours under reduced pressure. To 224.3 g (yield: 43%) of the dichlorophosphazene polymer thus obtained was added chlorobenzene to give a 20% solution. A solution of sodium salts of cyanophenol and phenol in toluene was prepared following the procedure of Synthesis Example 15.

To this solution of sodium salts of the phenols in toluene, 580 g of the previously prepared 20% chlorobenzene solution containing 1 unit mole (115.9 g) of dichlorophosphazene polymer as dissolved therein was added dropwise at an internal temperature of 30° C. or below with stirring, and the mixed solution thus obtained was refluxed for 12 hours. The reaction mixture was concentrated and precipitated again in a 5% aqueous solution of sodium hydroxide. Subsequently, the precipitated polymer was dissolved in tetrahydrofuran and precipitated again in water. This procedure was repeated three times. The obtained polymer was dried in a vacuum (vacuum drying conditions: 80° C., 5 mmHg, 12 hours) to give 213 g of a pale yellow viscous liquid. The results were shown below in Table 5.

It was confirmed from elemental analysis data of carbon, hydrogen, nitrogen, chlorine and phosphorus and spectral data of $^1$H-NMR and $^{31}$P-NMR that the composition of the final product was in agreement with the ratio of 4-cyanophenol and phenol fed so that the desired product was synthesized.

TABLE 5

|  | Synthesis Example | | | | | |
| --- | --- | --- | --- | --- | --- | --- |
|  | 20 | 21 | 22 | 23 | 24 | 25 |
| Yield (%) | 92 | 95 | 90 | 91 | 90 | 89 |
| Hydrolyzable chlorine (%) | 0.06 | 0.15 | 0.11 | 0.08 | 0.09 | 0.12 |
| Property | Liquid | Solid | Liquid | Liquid | Solid | Solid |
| Weight-average molecule weight | 990 | 1110 | 950 | 1080 | 1220 | 386000 |
| Melting point (° C.) | Not detected | 140 | Not detected | Not detected | Not detected | Unclear |
| Decomposition temp. (° C.) | 342 | 402 | 310 | 314 | 326 | 340 |

EXAMPLES 38 TO 48

Flame-retardant resin compositions were prepared by adding 15 parts of each of the cyanophenoxy group-containing phosphazene compounds prepared in Synthesis Examples 15 to 25 to a resin comprising 75 parts of an aromatic polycarbonate resin and 25 parts of ABS resin, mixing the components with a mixer, and melting and kneading the mixture with a laboplasto mill.

Each of these compositions was made into test pieces having the predetermined shape with a heat-press. These test pieces were subjected to the flame test according to the test method of UL-94, and Izod impact strength and the heat distortion temperature thereof were measured according to the following methods. These results are shown below in Table 6.

Flame test

Carried out by the vertical flame test according to the UL-94 standard, and the result was used as an index of flame retardancy. (Test piece: 1/16 inch in thickness, 5 inches in length, 0.5 inch in width)

Izod impact strength

Measured at 23° C. according to JIS K-7110 and the result was used as an index of impact resistance. (Test piece thickness 1/8 inch, with V notch)

Heat distortion temperature

Measured under the load of 18.6 kg/cm$^2$ according to ASTM D-648, and the result was used as an index of heat resistance.

COMPARATIVE EXAMPLE 12

Test pieces were prepared and the properties thereof were evaluated in the same manner as in Example 38 with the exception of using triphenyl phosphate in place of the phosphazene compound used in Example 38. The results are shown below in Table 6.

COMPARATIVE EXAMPLE 13

Test pieces were prepared and the properties thereof were evaluated in the same manner as in Example 38 with the exception of using a condensed phosphoric acid diphenyl ester crosslinked with resorcinol (a compound similar to CR733S produced by DAIHACHI CHEMICAL INDUSTRY CO., LTD.) in place of phosphazene compound used in Example 38. The results were shown below in Table 6.

COMPARATIVE EXAMPLE 14

Test pieces were prepared and the properties thereof were evaluated in the same manner as in Example 38 with the exception of not using the flame retardant. The results are shown below in Table 6.

EXAMPLE 49

A flame-retardant resin composition was prepared following the procedure of Example 38 and using 0.5 part of zinc chloride in addition to the components used in Example 38. Furthermore, following the procedure of Example 38, test pieces were prepared therefrom, and then the flame retardancy thereof was evaluated and Izod impact resistance and the heat distortion temperature thereof were measured. The results are shown below in Table 6.

EXAMPLE 50

A flame-retardant resin composition was prepared following the procedure of Example 38 and using 0.6 part of polytetrafluoroethylene (Prodoct of DAIKIN INDUSTRIES LTD., Tradename F-201) in addition to the components used in Example 38. Furthermore, following the procedure of Example 38, test pieces were prepared therefrom, and then the flame retardancy thereof was evaluated and Izod impact resistance and the heat distortion temperature thereof were measured. The results are shown below in Table 6.

EXAMPLES 51 TO 55

Flame-retardant resin compositions were prepared by adding 15 parts of each of the cyanophenoxy group-containing phosphazene compounds prepared in Synthesis Examples 15 to 19 to a resin comprising 70 parts of poly(2,6-dimethyl-1,4-phenylene)oxide and 30 parts of a rubber-modified impact resistant polystyrene, mixing the components with a mixer, and melting and kneading the mixture with a laboplasto mill. The flame test according to UL-94 was carried out, and Izod impact resistance and the heat distortion temperature were measured according to the above-mentioned methods. These results are shown below in Table 6.

COMPARATIVE EXAMPLE 15

A resin composition was prepared following the procedure of Example 51 and using triphenyl phosphate in place of the phosphazene compound used in Example 51. Furthermore, following the procedure of Example 51, test pieces were prepared therefrom, and then the flame retardancy thereof was evaluated and Izod impact resistance and the heat distortion temperature thereof were measured. The results are shown below in Table 6.

COMPARATIVE EXAMPLE 16

A resin composition was prepared following the procedure of Example 51 and using the condensed phosphoric acid diphenyl ester crosslinked with resorcinol (a compound similar to CR733S produced by DAIHACHI CHEMICAL INDUSTRY CO., LTD.) in place of the phosphazene compound used in Example 51. Furthermore, following the procedure of Example 51, test pieces were prepared therefrom, and then the flame retardancy thereof was evaluated and Izod impact resistance and the heat distortion temperature thereof were measured. The results are shown below in Table 6.

COMPARATIVE EXAMPLE 17

A resin composition was prepared following the procedure of Example 51 and using no flame retardant. Furthermore, following the procedure of Example 38, test pieces were prepared therefrom, and then the flame retardancy thereof was evaluated and Izod impact resistance and the heat distortion temperature thereof were measured. The results are shown below in Table 6.

EXAMPLE 56

A flame-retardant resin composition was prepared by adding 10 parts of the cyanophenoxy group-containing phosphazene compound prepared in Synthesis Example 15 to 100 parts of nylon-6 having a number average molecular weight of 25,000, mixing the components with a mixer, and melting and kneading the mixture with a laboplasto mill.

Following the procedure of Example 38, test piece was prepared therefrom, and the flame test was carried out according to the test method of UL-94. The result is shown below in Table 6.

COMPARATIVE EXAMPLE 18

A resin composition was prepared following the procedure of Example 56 and using the condensed phosphoric acid diphenyl ester crosslinked with resorcinol (a compound similar to CR733S produced by DAIHACHI CHEMICAL INDUSTRY CO., LTD.) in place of the phosphazene compound used in Example 56. Furthermore, following the procedure of Example 56, test piece was prepared therefrom, and the flame retardancy thereof was evaluated. The result is shown below in Table 6.

EXAMPLE 57

A flame-retardant resin composition was prepared by mixing 70 parts of a polycarbonate resin, 30 parts of a polybutylene terephtalate resin and 20 parts of the cyanophenoxy group-containing phosphazene compound prepared in Synthesis Example 15 with a mixer, and melting and kneading the mixture with a laboplasto mill.

Following the procedure of Example 38, test piece was prepared therefrom, and the flame test was carried out according to the test method of UL-94. The result is shown below in Table 6.

COMPARATIVE EXAMPLE 19

A resin composition was prepared following the procedure of Example 57 and using the condensed phosphoric acid diphenyl ester crosslinked with resorcinol (a compound similar to CR733S produced by DAIHACHI CHEMICAL INDUSTRY CO., LTD.) in place of the phosphazene compound used in Example 57. Furthermore, following the procedure of Example 57, test piece was prepared therefrom, and the flame retardancy thereof was evaluated. The result is shown below in Table 6.

EXAMPLE 58

A varnish was prepared by adding 10 parts of the cyanophenoxy group-containing phosphazene compound prepared in Synthesis Example 15 to 100 parts of bisphenol-A type epoxy resin. A glass cloth was impregnated with the varnish and the impregnated glass cloth was dried to give a prepreg. Subsequently, the predetermined number of pieces of prepregs were laminated, and the laminate was subjected to a heat-press processing at 160° C. or above to give two types of glass-epoxy board, one having a thickness of 1/8 inch and the other having a thickness of 1/16 inch. The obtained board was cut into the predetermined size to give test pieces.

These test pieces were subjected to the flame test according to the test method of UL-94. The results were shown below in Table 6. Juicing was not observed during the heat-press processing of the resin composition.

EXAMPLE 59

A flame-retardant resin composition was prepared in the same manner as in Example 58 with the exception of using the compound prepared in Synthesis Example 23 in place of the cyanophenoxy group-containing phosphazene compound used in Example 58 (the compound prepared in Synthesis Examples 15). Following the procedure of Example 58, test pieces were prepared and the flame retardancy thereof was evaluated. The result is shown below in Table 6. Juicing was not observed during the heat-press processing of this resin composition.

COMPARATIVE EXAMPLE 20

A resin composition was prepared in the same manner as in Example 58 with the exception of using a condensed phosphoric acid diphenyl ester crosslinked with resorcinol (a compound similar to CR733S produced by DAIHACHI CHEMICAL INDUSTRY CO., LTD.) in place of the phosphazene compound prepared in Synthesis Example 15. Following the procedure of Example 58, test pieces were prepared and the flame retardancy thereof was evaluated. The result is shown below in Table 6. Juicing was observed during the heat-press processing of this resin composition.

COMPARATIVE EXAMPLE 21

A resin composition was prepared in the same manner as in Example 58 with the exception of using no flame retardant. Following the procedure of Example 58, test pieces were prepared and the flame retardancy thereof was evaluated. The result is shown below in Table 6.

TABLE 6

| Ex. | Burning quality On ignition | Flame retardancy (UL-94) | Izod impact strength (kgf · cm/cm) | Heat distortion temperature (° C.) |
|---|---|---|---|---|
| 38 | none | V-0 | 59 | 100 |
| 39 | none | V-0 | 59 | 103 |
| 40 | none | V-0 | 58 | 103 |
| 41 | none | V-0 | 59 | 105 |
| 42 | none | V-0 | 58 | 107 |
| 43 | none | V-0 | 58 | 103 |
| 44 | none | V-0 | 59 | 107 |
| 45 | none | V-0 | 55 | 92 |
| 46 | none | V-0 | 56 | 94 |
| 47 | none | V-0 | 58 | 101 |
| 48 | none | V-0 | 57 | 102 |
| 49 | none | V-0 | 60 | 110 |
| 50 | none | V-0 | 58 | 105 |
| 51 | none | V-0 | 9 | 128 |

TABLE 6-continued

| | Burning quality On ignition | Flame retardancy (UL-94) | Izod impact strength (kgf · cm/cm) | Heat distortion temperature (° C.) |
|---|---|---|---|---|
| 52 | none | V-0 | 8 | 128 |
| 53 | none | V-0 | 9 | 130 |
| 54 | none | V-0 | 9 | 130 |
| 55 | none | V-0 | 9 | 131 |
| 56 | none | V-0 | — | — |
| 57 | none | V-0 | — | — |
| 58 | none | V-0 | — | — |
| 59 | none | V-0 | — | — |
| Comp. Ex. | | | | |
| 12 | FS | V-2 | 49 | 80 |
| 13 | FS | V-2 | 50 | 89 |
| 14 | FS · Burnt out | Not rated | 61 | 111 |
| 15 | FS | V-2 | 5 | 110 |
| 16 | FS | V-2 | 6 | 115 |
| 17 | FS · Burnt out | Not rated | 9 | 133 |
| 18 | none | V-1 | — | — |
| 19 | FS | V-2 | — | — |
| 20 | FS | V-2 | — | — |
| 21 | FS · Burnt out | Not rated | — | — |

FS = Flame detardancy was not shown

Table 6 shows that the resin compositions of the present invention comprising optimum amounts of resins and phosphazene compounds are very well-balanced among excellent flame retardancy, impact resistance and heat resistance (Examples 38 to 59). It is also seen from Example 49 that when a small amount of zinc chloride is added to a resin composition comprising a resin mixture of an aromatic polycarbonate resin, ABS resin and a cyanophenoxy group-containing phosphazene compound, the resulting has still higher flame retardancy and impact resistance. On the other hand, when a phosphoric acid ester compound is used as a flame retardant, the resulting resin compositions are poor in flame retardancy and heat resistance and are of low value for use (Comparative Examples 12, 13, 15, 16 and 18 to 20).

EXAMPLE 60

Pellets of a flame-retardant resin composition according to the present invention were prepared by kneading with a biaxial extruder a mixture of 100 parts of a resin composition comprising 75 parts of an aromatic polycarbonate resin (Trade name: Iupilon S-2000N, Product of MITSUBISHI ENGINEERING PLASTICS Co., Ltd.) and 25 parts of ABS resin (Trade name: SANTAK UT-61, Product of MITSUI CHEMICALS INC.), 5.0 parts of a triphenyl phosphate (Product of WAKO Pure Chemical Industrie, Ltd.), 5.0 parts of the phenoxyphosphazene prepared in Synthesis Example 14 and 0.6 part of polytetrafluoroethylene (Trade name: G-307, Product of ASAHI GLASS Co., Ltd.), followed by pelletization.

COMPARATIVE EXAMPLES 22 AND 23

Pellets of resin compositions were prepared in the same manner as in Example 60 with the exception of using 10 parts of triphenyl phosphate alone (Comparative Example 22) or 10 parts of phenoxyphosphazene alone (Comparative Example 23), without using triphenyl phosphate in combination with the phenoxyphosphazene.

EXAMPLES 61 TO 63

Pellets of flame-retardant resin compositions according to the present invention were prepared in the same manner as in Example 60 with the exception of using triphenyl phosphine oxide (Product of KANTO CHEMICAL Co., Inc., Example 61), tricresyl phosphate (Product of WAKO Pure Chemical Industrie, Ltd., Example 62) or resolsinol bis(2,6-dimethylphenyl phophate), Example 63) in place of the triphenyl phosphate as the halogen-free organic phosphorus compound.

COMPARATIVE EXAMPLES 24 TO 26

Pellets of resin compositions were prepared in the same manner as in Examples 61 to 63 with the exception of using 10 parts of triphenyl phosphine oxide alone (Comparative Example 24), tricresyl phosphate alone (Comparative Example 25) or resolsinol bis(2,6-dimethylphenyl phophate) (Comparative Example 26), without using the halogen-free organic phosphorus compound in combination with the phenoxyphosphazene.

EXAMPLE 64

Pellets of a flame-retardant resin composition according to the present invention were prepared in the same manner as in Example 60 with the exception of using the phosphazene compound prepared in Synthesis Example 3 in place of the phenoxyphosphazene.

EXAMPLE 65

Pellets of a flame-retardant resin composition according to the present invention were prepared in the same manner as in Example 60 with the exception of using the phosphazene compound prepared in Synthesis Example 4 in place of the phenoxyphosphazene.

EXAMPLE 66

Pellets of a flame-retardant resin composition according to the present invention were prepared in the same manner as in Example 60 with the exception of using a modified-PPE resin (Trade name: Xyron X9108, Product of ASAHI CHEMICAL Co., Ltd.) in place of the resin mixture of polycarbonate resin and ABS resin.

The resins, the halogen-free organic phosphorus compounds and the phosphazene compounds used in Examples 60 to 66 and Comparative Examples 22 to 26 are all shown in Table 7. Figures in parentheses are the amounts used (parts).

TABLE 7

| | Resin | Hagogen-free organic phosphorus compound | Phosphazene compound |
|---|---|---|---|
| Ex. | | | |
| 60 | PC (75)/ABS (25) | TPP (5) | Synthesis Example 14 (5) |
| 61 | PC (75)/ABS (25) | TPPO (5) | Synthesis Example 14 (5) |
| 62 | PC (75)/ABS (25) | TCP (5) | Synthesis Example 14 (5) |
| 63 | PC (75)/ABS (25) | LBDP (5) | Synthesis Example 14 (5) |
| 64 | PC (75)/ABS (25) | TPP (5) | Synthesis Example 3 (5) |
| 65 | PC (75)/ABS (25) | TPP (5) | Synthesis Example 4 (5) |
| 66 | Modified-PPE resin (100) | TPP (5) | Synthesis Example 14 (5) |
| Comp. Ex. | | | |
| 22 | PC (75)/ABS (25) | TPP (10) | — |
| 23 | PC (75)/ABS (25) | — | Synthesis |

TABLE 7-continued

| | Resin | Hagogen-free organic phosphorus compound | Phosphazene compound |
|---|---|---|---|
| | | | Example 14 (10) |
| 24 | PC (75)/ABS (25) | TPPO (10) | — |
| 25 | PC (75)/ABS (25) | TCP (10) | — |
| 26 | PC (75)/ABS (25) | LBDP (10) | — |

PC: Aromatic polycarbonate resin (Trade name: Iupilon S-2000N, Product of MITSUBISHI ENGINEERING PLASTICS Co., Ltd.)
ABS: ABS resin (Trade name :SANTAK UT-61, Product of MITSUI CHEMICALS INC.)

TPP: Triphenyl phosphate (Product of WAKO Pure Chemical Industrie, Ltd.)
TPPO: Triphenyl phosphine oxide (Product of KANTO CHEMICAL Co., Ltd.)
TCP: Tricresyl phosphate (Product of WAKO Pure Chemical Industrie, Ltd.)
LBDP: Resolsinol bis(2,6-dimethylphenyl phophate)

The pellets of the resin compositions prepared in Examples 60 to 66 and Comparative Examples 22 to 26 were injection-molded to give test pieces having predetermined shape. These test pieces were subjected to the flame test according to the test method of UL-94, and measurement was made of the flexural modulus, heat distortion temperature, Izod impact strength and melt flow rate. The flame test, heat distortion temperature and Izod impact strength were measured according to the method as described above. The flexural modulus and melt flow rate were measured according to the following methods.

Flexural modulus
  Measured according to JIS K-7203.
Melt flow rate
  Measured at 240° C. under a load of 10 kg/cm² according to JIS K-7210.
These results are shown below in Table 8.

EXAMPLE 67

A varnish of a flame-retardant composition of the present invention was prepared by mixing 100 parts of a bisphenol A type epoxy resin (Trade name: EP5400, Product of ASAHI DENKA KOGYO K.K.), 7.5 parts of triphenyl phosphate, 7.5 parts of the phenoxyphosphazene prepared in Synthesis Example 14 and 0.6 part of polytetrafluoroethylene (G-307).

A glass cloth was impregnated with this varnish and the impregnated glass cloth was dried to give a prepreg. Subsequently, 5 pieces of the prepregs were laminated and pressed with heating at 160° C. under a pressure of 50 kg/cm² to give a glass-epoxy board having a thickness of 1.6 mm. The obtained glass epoxy board was cut into a length of 12.7 cm and a width of 1.3 cm to give test pieces. These test pieces were subjected to each of the tests as described above. The results are shown below in Table 8.

TABLE 8

| | Flame retardancy (UL-94) | Flexural modulus (Kg/cm²) | Heat distortion temperature (° C.) | Izod impact strength (Kgf · cm/cm) | Melt flow rate (g/10 min) |
|---|---|---|---|---|---|
| Ex. | | | | | |
| 60 | V-0 | 2.4 × 10⁴ | 94 | 88 | 35 |
| 61 | V-0 | 2.4 × 10⁴ | 80 | 88 | 36 |
| 62 | V-0 | 2.4 × 10⁴ | 99 | 87 | 40 |
| 63 | V-0 | 2.4 × 10⁴ | 97 | 78 | 65 |
| 64 | V-0 | 2.4 × 10⁴ | 101 | 85 | 45 |
| 65 | V-0 | 2.4 × 10⁴ | 90 | 87 | 30 |
| 66 | V-0 | 2.5 × 10⁴ | 133 | 20 | 71 |
| 67 | V-0 | 0.1 × 10⁴ | 79 | — | — |
| Comp. Ex. | | | | | |
| 22 | V-2 | 2.4 × 10⁴ | 85 | 67 | 28 |
| 23 | V-1 | 2.4 × 10⁴ | 69 | 68 | 15 |
| 24 | HB | 2.4 × 10⁴ | 57 | 59 | 45 |
| 25 | V-1 | 2.4 × 10⁴ | 91 | 60 | 35 |
| 26 | V-1 | 2.4 × 10⁴ | 97 | 58 | 30 |

What is claimed is:
1. A crosslinked phenoxyphosphazene compound characterized in that at least one phosphazene compound selected from the group consisting of a cyclic phosphazene compound represented by the formula (1)

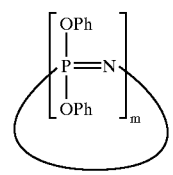

(1)

wherein m is an integer of 3 to 25 and Ph is a phenyl group and a straight-chain phosphazene compound represented by the formula (2)

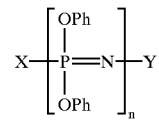

(2)

wherein X is a group —N=P(OPh)₃, or a group —N=P(O)OPh, Y is a group —P(OPh)₄ or a group —P(O) (OPh)₂, n is an integer of 3 to 1000 and Ph is as defined above, is crosslinked with at least one crosslinking group selected from the group consisting of o-phenylene group, m-phenylene group, p-phenylene group, biphenylene group, and a group

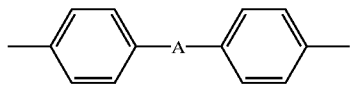

wherein A is —C(CH$_3$)$_2$—, —SO$_2$—, —S— or —O—; wherein each of said crosslinking groups is interposed between the two oxygen atoms left after the elimination of phenyl groups from the phosphazene compound; and wherein the amount of the phenyl groups in the crosslinked compound is 50 to 99.9% based on the total number of the phenyl groups in said phosphazene compound represented by the formula (1) and/or said phosphazene compound represented by the formula (2).

2. A flame retardant comprising a crosslinked phenoxyphosphazene compound characterized in that at least one phosphazene compound selected from the group consisting of a cyclic phosphazene compound represented by the formula (1)

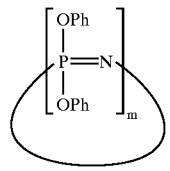

(1)

wherein m is an integer of 3 to 25 and Ph is a phenyl group and a straight-chain phosphazene compound represented by the formula (2)

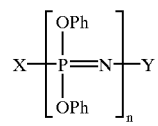

(2)

wherein X is a group —N=P(OPh)$_3$, or a group —N=P(O)OPh, Y is a group —P(OPh)$_4$ or a group —P(O)(OPh)$_2$, n is an integer of 3 to 1000 and Ph is as defined above, is crosslinked with at least one crosslinking group selected from the group consisting of o-phenylene group, m-phenylene group, p-phenylene group, biphenylene group, and a group

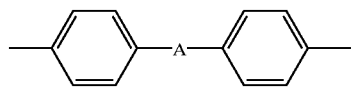

wherein A is —C(CH$_3$)$_2$—, —SO$_2$—, —S— or —O—; wherein each of said crosslinking groups is interposed between the two oxygen atoms left after the elimination of phenyl groups from the phosphazene compound; and wherein the amount of the phenyl groups in the crosslinked compound is 50 to 99.9% based on the total number of the phenyl groups in said phosphazene compound represented by the formula (1) and/or said phosphazene compound represented by the formula (2).

* * * * *